United States Patent [19]

Eshghy

[11] Patent Number: 5,284,217
[45] Date of Patent: Feb. 8, 1994

[54] APPARATUS FOR TIGHTENING THREADED FASTENERS BASED UPON A PREDETERMINED TORQUE-ANGLE SPECIFICATION WINDOW

[75] Inventor: Siavash Eshghy, Solon, Ohio

[73] Assignee: Allen-Bradley Company, Inc., Milwaukee, Wis.

[21] Appl. No.: 43,881

[22] Filed: Apr. 7, 1993

Related U.S. Application Data

[60] Division of Ser. No. 889,932, Jun. 2, 1992, Pat. No. 5,212,862, which is a continuation of Ser. No. 594,532, Oct. 9, 1990, Pat. No. 5,131,130.

[51] Int. Cl.$^5$ .......................... B23P 19/04; B23Q 5/00
[52] U.S. Cl. ........................................ 173/176; 29/240
[58] Field of Search .............. 29/407, 456, 240, 240.5; 73/862.23, 761; 173/176

[56] References Cited

U.S. PATENT DOCUMENTS

| | | |
|---|---|---|
| Re. 31,569 | 5/1984 | Eshghy . |
| 3,962,910 | 6/1976 | Spyridakis et al. . |
| 4,091,451 | 5/1978 | Weiner et al. . |
| 4,106,570 | 8/1978 | Eshghy et al. . |
| 4,161,220 | 7/1979 | Carlin et al. ................... 173/176 |
| 4,208,775 | 6/1980 | McCombs et al. . |
| 4,210,017 | 7/1980 | Motsinger . |
| 4,259,775 | 4/1981 | Eshghy . |
| 4,259,869 | 4/1981 | Carlin . |
| 4,305,471 | 12/1981 | Eshghy . |
| 4,344,216 | 8/1982 | Finkelston . |
| 4,375,120 | 3/1983 | Sigmund . |
| 4,375,121 | 3/1983 | Sigmund . |
| 4,375,122 | 3/1983 | Sigmund . |
| 4,375,123 | 3/1983 | Ney . |
| 4,400,785 | 8/1983 | Wallace et al. . |
| 4,413,396 | 11/1983 | Wallace et al. . |
| 4,426,887 | 1/1984 | Reinholm et al. . |
| 4,450,727 | 5/1984 | Reinholm et al. . |
| 4,620,450 | 11/1986 | Yamaguchi . |

FOREIGN PATENT DOCUMENTS

| | | |
|---|---|---|
| 3133679 | 4/1982 | Fed. Rep. of Germany . |
| 3212038 | 11/1982 | Fed. Rep. of Germany . |
| 2035171 | 6/1980 | United Kingdom . |
| 2096361 | 10/1982 | United Kingdom . |

OTHER PUBLICATIONS

"Quality Assurance and Zero Defects Assembly by Use of Brushless DC Nutrunners for the Tightening of Bolted Joints", by Pantel, Wolfgang E., SME Technical Paper No. AD84-851, 1984.

"A Simple Method of Arriving at Torque or Angle Specifications", Eshghy, S., SME Technical Paper No. AD86-880, 1986.

"Application and Reapplication of Torque to Threaded Fasteners", Eshghy, S., SME Technical Paper No. AD88-757, 1988.

Primary Examiner—Mark Rosenbaum
Assistant Examiner—David P. Bryant
Attorney, Agent, or Firm—Quarles & Brady

[57] ABSTRACT

An apparatus for tightening threaded fasteners to any desired proportion of the way through a torque-angle specification window defined by low and high angle limits and low and high torque limits. The torque rate for the joint is determined from torque and angle measurements taken during tightening and compared to boundary ratios which are determined as the rates of change of torque with respect to angle from a threshold torque to the corners of the specification window. A final target parameter value of either torque or angle is calculated based upon this comparison which is approximately halfway through the specification window along a projection of a torque-angle characteristic curve for the fastener which is determined from the torque rate. Correction factors are also provided for tool overrun depending upon whether torque or angle control is used and a reject rate margin is employed to account for nonlinearities which otherwise may lead to unacceptable assemblies. The upper limits of the specification window are also avoided to prevent the creation of rejects.

4 Claims, 21 Drawing Sheets

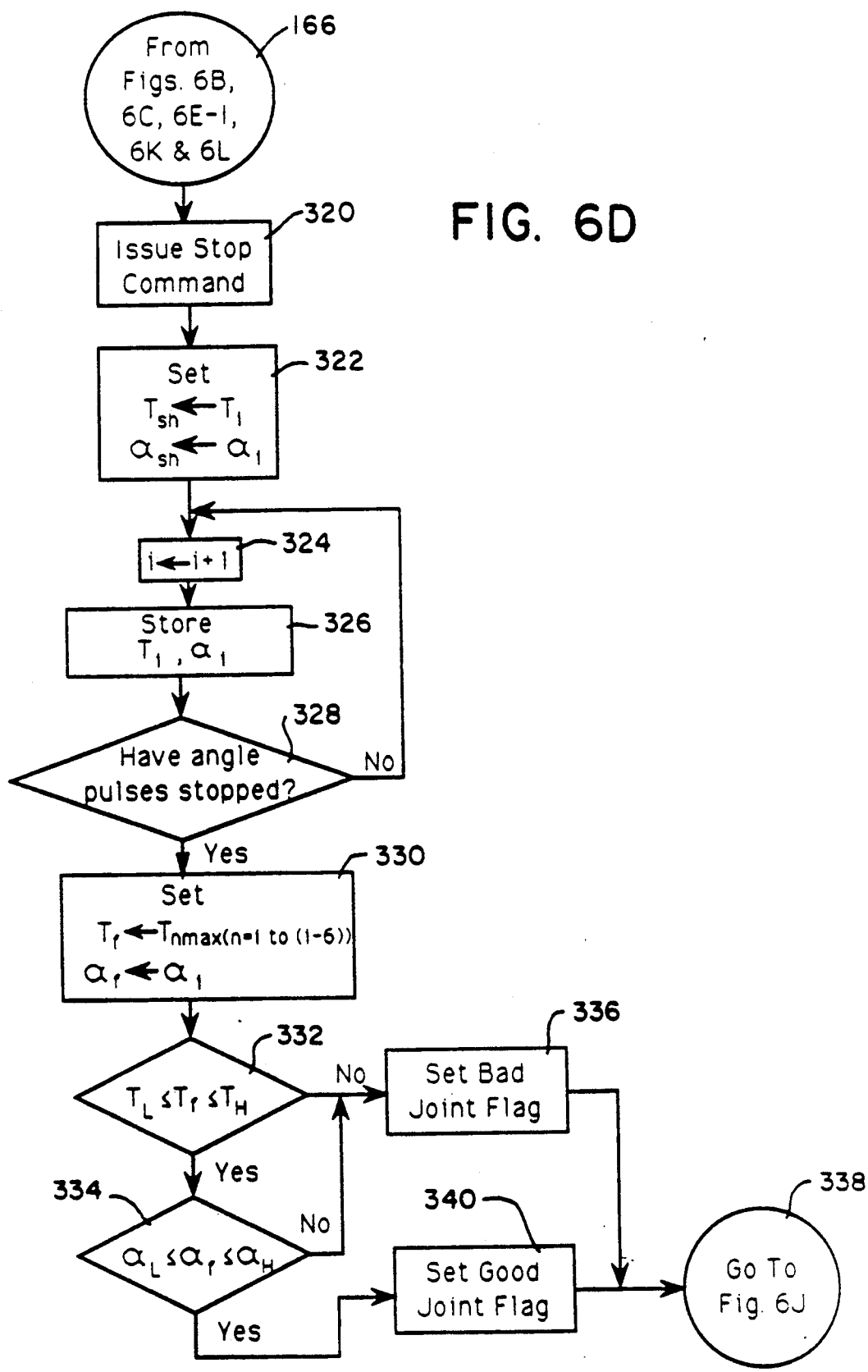

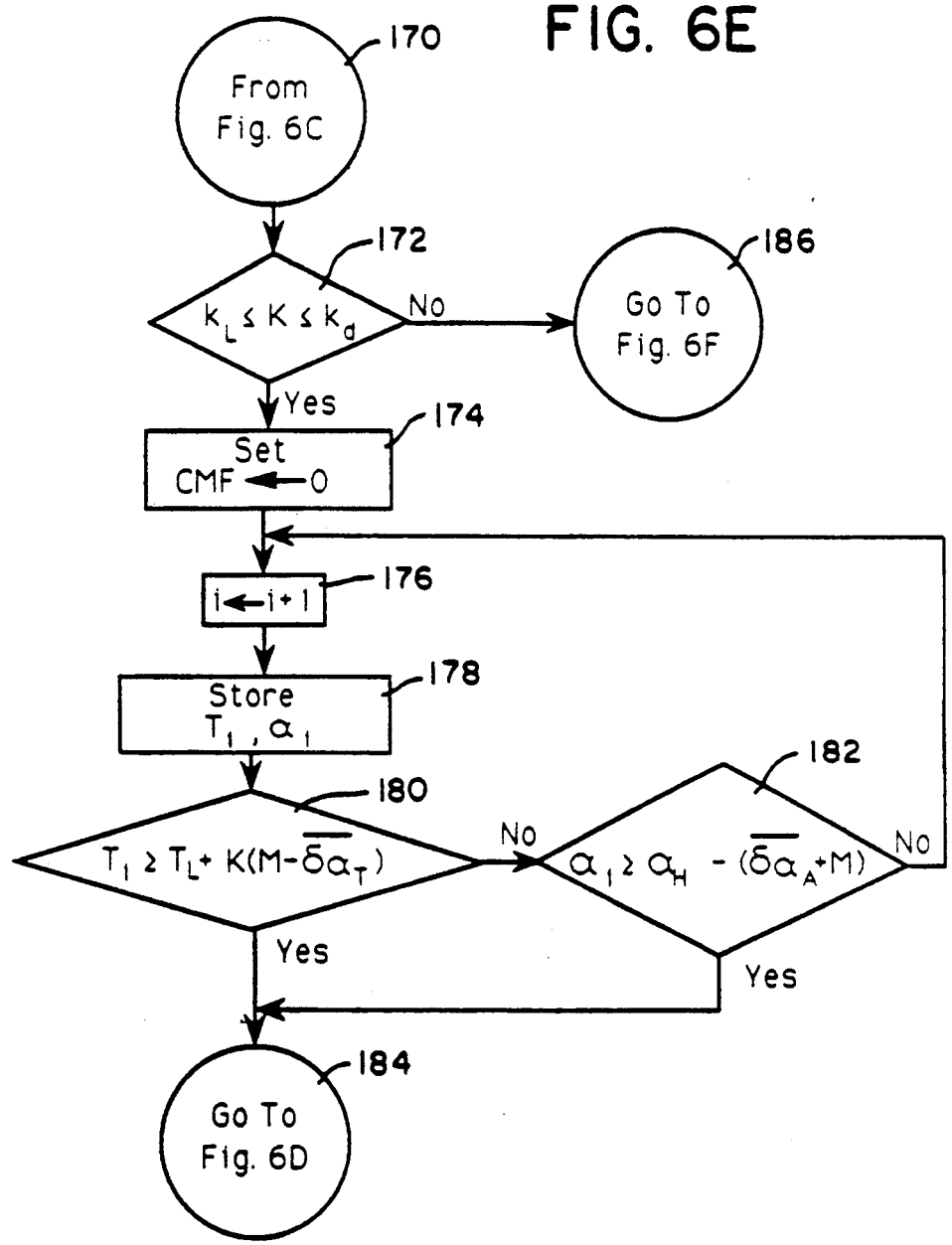

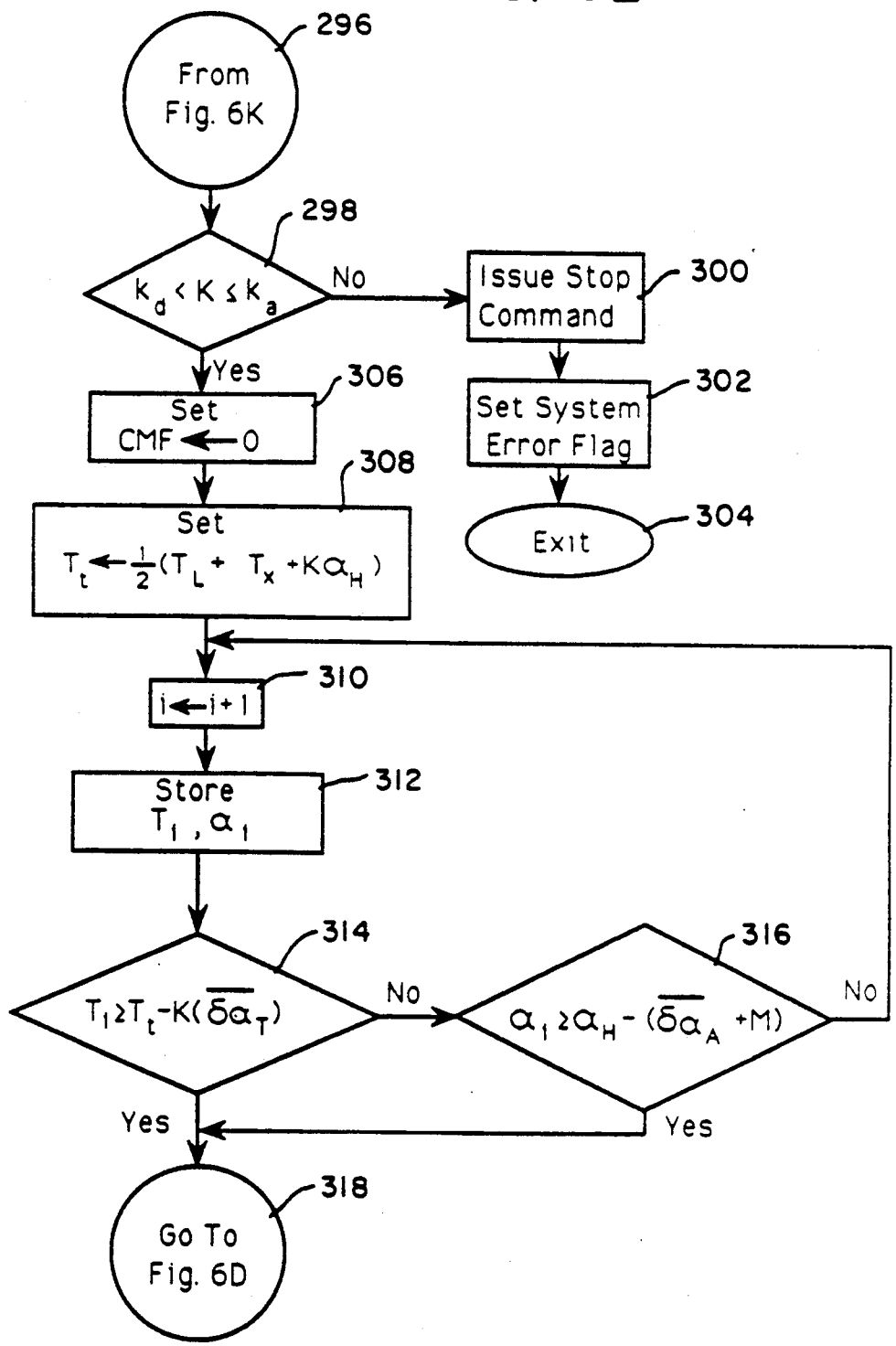

APPARATUS FOR TIGHTENING THREADED FASTENERS BASED UPON A PREDETERMINED TORQUE-ANGLE SPECIFICATION WINDOW This is a division, of application Ser. No. 07/889,932, filed Jun. 2, 1992, now issued as U.S. Pat. No. 5,212,862, which is a continuation of application Ser. No. 07/594,532, filed Oct. 9, 1990, now issued as U.S. Pat. No. 5,131,130.

FIELD OF THE INVENTION

The invention relates to a method and apparatus for tightening threaded fasteners within a torque-angle specification window.

BACKGROUND OF THE INVENTION

Threaded fastener pairs (e.g., a bolt and a nut, a stud and a tapped hole, etc.) used in assembly of parts are intended to produce a clamp load that can be sustained when the assembled parts are subjected to service loads. The clamp loads produced during an assembly must be less than a maximum value in order to avoid damaging the parts. In most cases, the fasteners are the weakest elements. The maximum clamp load in such cases is the yield strength in the threaded areas, usually expressed in bolt tension. There are also applications where the clamped pieces have limited strength. The maximum value is then specified based on the characteristics of the clamped pieces. The clamp load must also be greater than a minimum value to prevent failure in service. The assembly process, from a clamp load point of view, therefore becomes a compromise between field failure (i.e., excessively low bolt tension) and assembly failure (i.e., excessively high bolt tension). The degree of compromise is dependent on the precision of the process of controlling the clamped load. The cost of imprecision is a bulky design and/or diminished product quality in assembly.

There are currently laboratory methods and in-plant audit techniques of measuring clamp load or bolt tension, but there is no acceptable procedure for on-line monitoring of these values. Implementation of clamp load control in assembly plants therefore is based on indirect methods which measure a quantity that correlates to tension, thus deducing the latter based on its impirical relationship to the former. There are two quantities that can readily be measured externally with instruments contained within the power tool that tightens the fastener. These quantities are torque and angle.

A usual practice in tightening a threaded fastener to make a joint has been to tighten the fastener to within a tolerance bracketed by predetermined specifications or limits of a low torque and a high torque. Other methods have also existed, such as the "turn-of-the-nut" strategy, also known as "torque-turn", which the fastener is turned to within a range bounded by a low angle and a high angle, usually measured from a predetermined reference or threshold torque. Another more sophisticated method has been to tighten the fastener to a desired tension based on torque and angle measurements, as described in U.S. Pat. No. Re. 31,569, "Tension Control of Fasteners".

The use of simultaneous torque specifications and angle specifications is also in use in some assembly plants. For example, torque control may be used in which a low torque limit and a high torque limit are established to take into account meeting the maximum tension, the minimum tension, and assembly process capability requirements. In the assembly process, torque varies between the high and low torque limits, and angle scatters naturally in a band within any given confidence level. Angle specifications, in terms of a low angle limit and a high angle limit which can be derived from data for any given joint, are specified and used simultaneously for automatic detection of abnormalities.

Similarly, where the main mode of control is a predetermined angle range from some reference torque, it has been customary to introduce torque specifications for quality control purposes. If a joint is within the angle range but not the torque range, or vice versa, it is rejected.

The simultaneous existence of torque specifications and angle specifications defines a window on a plot of torque versus angle which is bounded on the top by the high torque limit, on the bottom by the low torque limit, at the left by the low angle limit and at the right by the high angle limit. A properly specified window defines a natural area on a plot of torque versus angle which encompasses torque-angle values that accomplish clamp load control and quality control goals in the assembly process. Such windows may or may not be rectangular or even closed.

Past attempts at reaching the window have generally been confined to discontinuing tightening as soon as the window is entered, i.e., when both the low angle limit and the low torque limit have been equalled or exceeded, based on measuring the torque and angle during the tightening process. These attempts have resulted in the final torque-angle value being less than optimal, and in some cases very close to the boundary of the window, resulting in a bias in these processes to produce a low clamp load.

SUMMARY OF THE INVENTION

The invention provides an improved method and means for tightening a threaded fastener a predetermined proportion of the way, preferably halfway, into a torque-angle specification window defined by a low angle limit, a high angle limit, a low torque limit and a high torque limit. The fastener is tightened with an instructable powered tool while sensing torque and the associated angle characteristic values for the fastener. An advancement of the fastener a predetermined proportion of the way through the torque-angle window, or to a predetermined target curve within the window, along a torque-angle characteristic path is determined from the sensed values of torque and angle for the fastener being tightened. The tool is then instructed to terminate tightening in response to the proportion of advancement through the window. In this way, optimally tightened joints are produced to any desired proportion of the way into the window for the particular fastener being tightened. The number of marginal joints at or near the lower boundaries of the specification window is reduced, and joints are reliably tightened to well within the window, thereby avoiding the low tension bias of previous tightening processes.

As stated, the joint is preferably tightened to approximately halfway through the specification window. This puts the final torque-angle values for the joint within the window and as far away as possible from the specification limits to produce the best joint possible for the specific combination of components that make up the joint.

In one aspect of the invention, the slope of the torque-angle curve for the particular fastener being tightened is calculated before reaching the window based on measured values of torque and angle. Using the calculated slope, a target point on a projection of the characteristic curve for the fastener which is midway through the window is calculated, and which may be in terms of either torque or angle. The tool is then given a command so that tightening terminates at that point.

In an alternative aspect, tightening can be terminated in response to solving an equation which defines a target curve in the specification window. In this aspect, the target curve equation is solved for its intersection with a projection of the torque angle curve for the fastener being tightened to determine a target torque or angle value.

Under either approach, it is especially useful to determine where the torque and angle values for the fastener being tightened are directed relative to the torque-angle window. In the preferred embodiment, this is accomplished by comparing the torque rate (the rate of change of torque with respect to angle) for the fastener being tightened to the torque rates from a threshold torque to the corners of the specification window. The window is divided into zones whose boundaries are determined by the torque rates associated with the corners, and the method of determining the target parameter, or in the alternative which target equation must be solved, depends upon which zone applies to the torque and angle values for the fastener being tightened.

In a preferred aspect of the invention, tightening is continued even if the initial calculation of the torque rate for the fastener indicates that it will miss the window, as long as the torque rate is within an acceptable envelope which is larger by a reject rate margin than the envelope defined by the window. In this way, the joint is given the benefit of the doubt that favorable nonlinearities which can occur later in the tightening cycle will cause the joint to enter the window.

In another useful aspect, a shut-off command is issued to the tool prior to advancing to the final target value by a distance at least equal to a tool overrun. Preferably, the tool overrun value is adjusted to compensate for tool variations as the tightening operation is carried out and to account for whether angle control or torque control is employed.

In another especially useful aspect, the upper boundaries of the window are avoided so as to not knowingly create assembly rejects. In this regard, a shutoff command is issued within a certain margin of either of the upper boundaries of torque and angle.

BRIEF DESCRIPTION OF THE DRAWINGS

FIGS. 6A-L illustrate a flow chart for executing the method of the invention using the system of FIG. 1;

DETAILED DESCRIPTION OF THE PREFERRED EMBODIMENT

Figure 1:
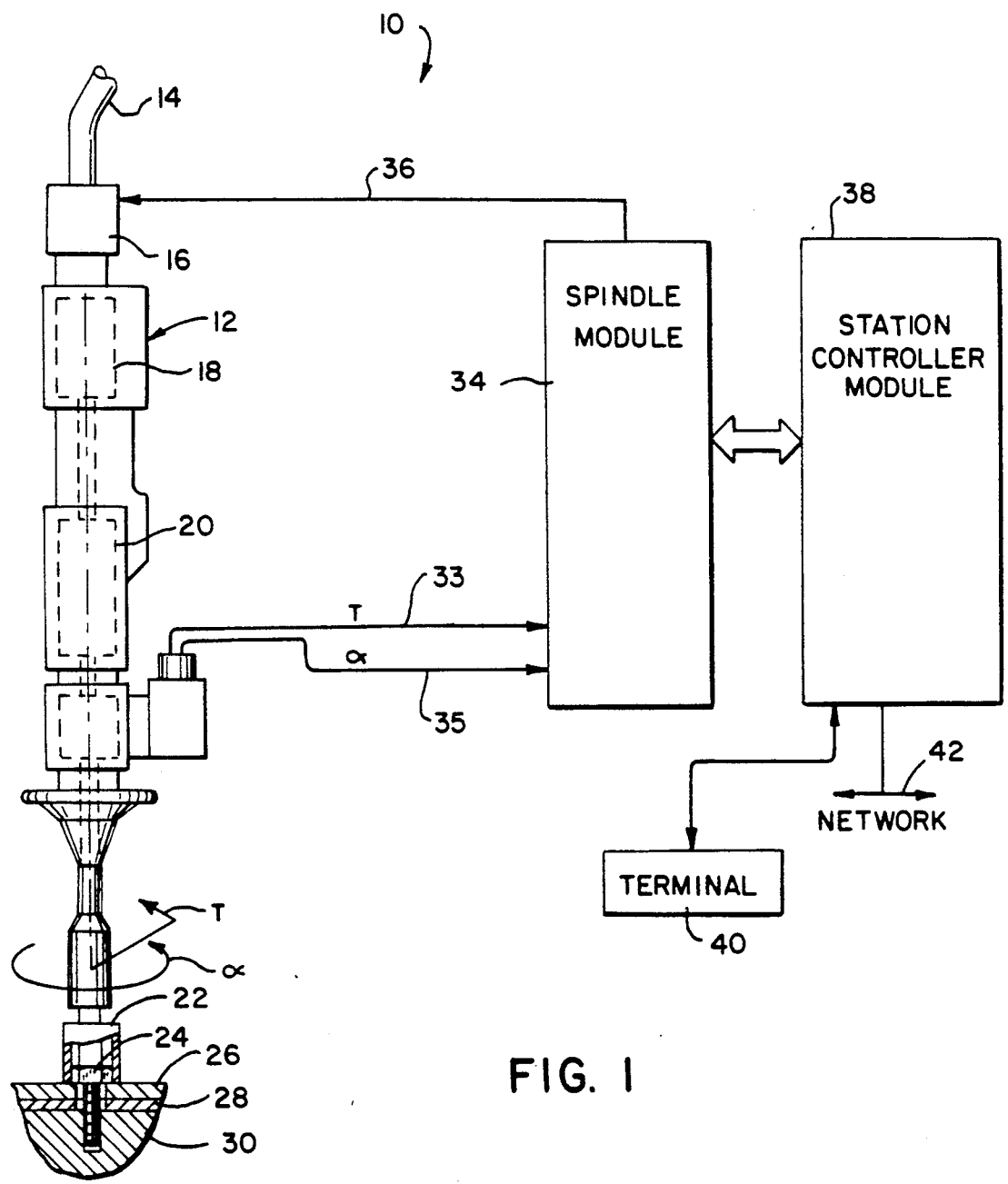
FIG. 1 is a schematic illustration of a representative instructable fastening tool system for implementing the present invention.

FIG. 1 illustrates a fastener tightening station 10 which is commonly used in manufacturing operations. The station includes a nutrunner 12 which may be either pneumatic or electric powered. In the embodiment illustrated, the nutrunner 12 is pneumatic, having an air hose 14 which is supplied with compressed air from a suitable source and is connected to an electrical control solenoid 16. The nutrunner 12 has an air motor 18 and also typically has a planetary gearbox 20 with an output shaft connected to a socket 22 or other suitable means for driving a threaded fastener such as the bolt 24 illustrated, a nut, a stud, or any other type of threaded fastener. In FIG. 1, the bolt or fastener 24 and the threaded hole 30 make up a fastener pair, which is tightened by the tool 12.

The fastener 24 makes up part of the joint which connects components 26, 28 and 30 constituting a joint. In the joint shown, a gasket 28 is sandwiched between relatively incompressible layers 26 and 30, which may for example be steel such as in the connection of a cylinder head to an engine block. This type of joint is commonly known as a "soft" joint, because of the presence of the relatively compressible gasket 28. It should be understood that the invention is applicable to any type of joint which includes a threaded fastener, including "hard" joints in which there are no relatively compressible components such as a gasket.

The nutrunner 12 is of a commercially available type which produces an electrical signal output in response to the torque applied to the fastener 24 (line 33 in FIG. 1) and an electrical signal output at equal angular increments of advancement of the fastener 24 (line 35 in FIG. 1). The particular nutrunner and torque and angle transducers used in the tool are well known, commercially available components. Any kind of a nutrunner 12 which produces torque and angle signals for subsequent processing may be used for practicing the invention. In the preferred embodiment disclosed, a Rockwell Model 74MTEV998 pneumatic nutrunner which is supplied with torque and angle transducers was found suitable. A Rockwell Model 64PSDC-908 electric nutrunner was also found suitable as described below.

The nutrunner 12 is controlled by a spindle module 34, which receives the torque and angle signals from the tool. A control signal from the spindle module 34 is output on line 36 to either energize or de-energize the solenoid 16, thereby turning the nutrunner 12 on or off. It should be noted however, that the tool does not stop immediately when this instruction is given, mainly due to the time it takes for the solenoid 16 to stop the flow of air to the air motor 18. The additional angular rotation of the fastener after the shut-off command is issued is known as the "tool overrun", and is corrected for in the preferred embodiment, as described below. If an electric nutrunner were used, stopping of the nutrunner could be controlled so that tool overrun was reduced in magnitude, but it may still be desirable to include a tool overrun correction factor in the determination of the shutoff torque or angle value.

The spindle module 34 receives and stores the torque and angle signals from the nutrunner 12. The spindle module 34 contains a 68000 CMOS microprocessor manufactured by Motorola, 16 kilobytes of static random access memory ("SRAM") for torque and angle storage and 128 kilobytes of erasable programmable read-only memory ("EPROM") for program instructions. In addition, the spindle module 34 contains two kilobytes of nonvolatile random access memory ("RAM"), for parameter storage as described below.

The spindle module 34 receives instructions from a station controller module 38, which also incorporates a CMOS 68000 microprocessor, through a "download" process. The station controller module 38, in addition to the microprocessor, has 576 kilobytes of non-volatile RAM and 1000 kilobytes of EPROM for program storage as is generally understood in the art. The station controller module 38 is provided with two RS-232 serial ports for connecting to configuration terminals 40 and an RS-485 port for linking the station controller module 38 to a network 42 to provide data access from remote terminals 40. The configuration terminals 40 are used by an operator to set input parameters and select various tightening strategies.

Hardware systems such as this for controlling the tightening of threaded fasteners are common in industry using fastener tightening strategies based on torque, angle, or tension. When programmed according to the flowcharts illustrated in FIGS. 5 and 6A-L, described below, the same system hardware can be used to control the nutrunner 12 according to a fastener tightening strategy of the invention. In the preferred embodiment, the particular system found suitable including the spindle module 34 and station controller module 38 is the Pro-Spec 6000 Fastening System which is commercially available from Allen-Bradley Company, Inc., Milwaukee, Wis. The Pro-Spec TM 6000 is also available to control an electrically powered nutrunner, which may be used to practice the invention as described above. Tightening system hardware including such an electric powered nutrunner is described in copending, commonly assigned U.S. patent application Ser. No. 07/461,633, filed Jan. 8, 1990, the disclosure of which is hereby incorporated by reference.

Figure 2A:
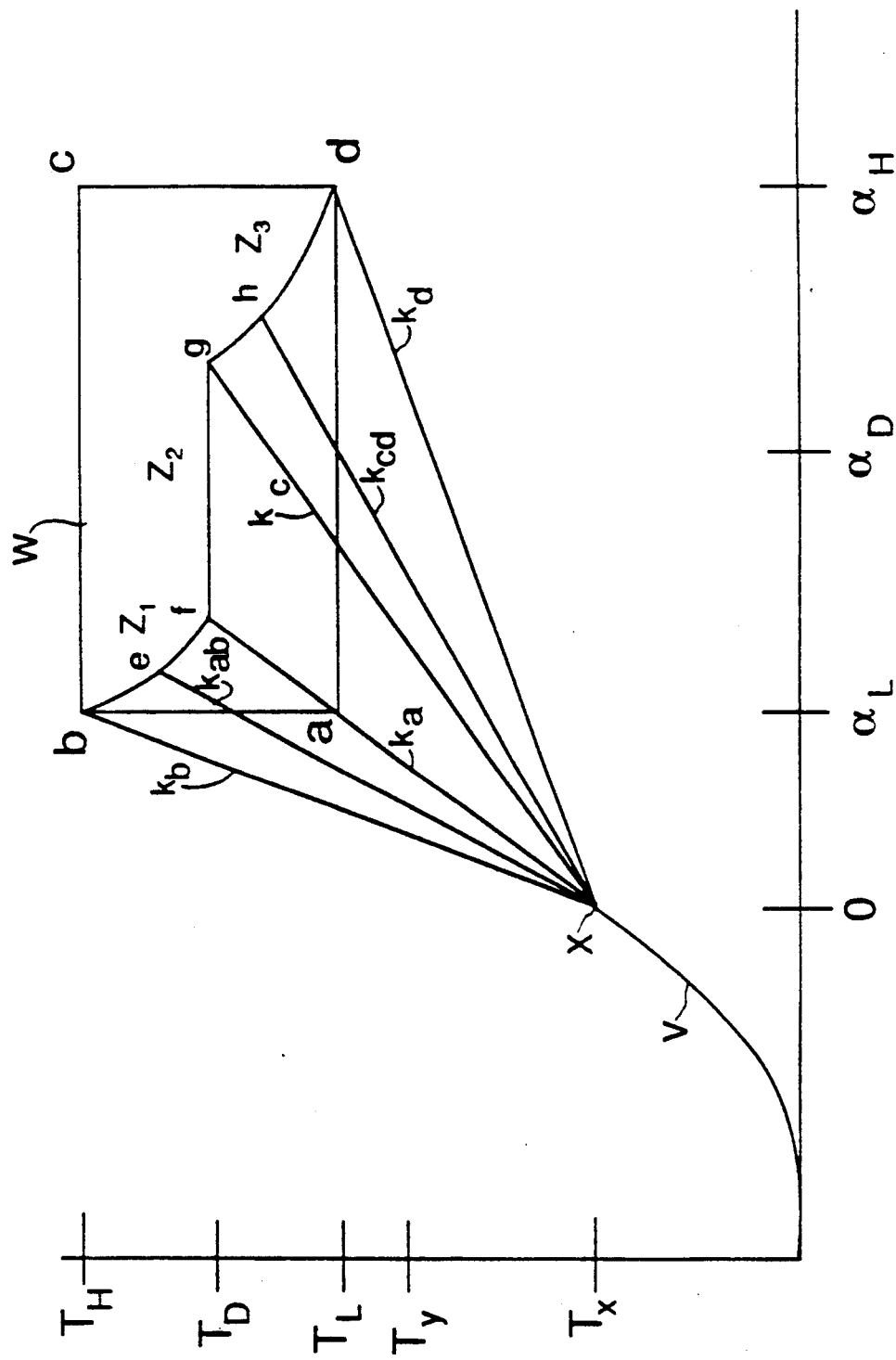
FIG. 2A is an illustration of a representative torque-angle specification window and graphical representations of a variety of torque-angle characteristic curves.

FIG. 2A illustrates torque-angle characteristic curves for a tightening strategy of the invention. In the tightening strategy of the invention, a window W on a plot of torque versus angle is defined by a high torque limit $T_H$, a low torque limit $T_L$, a high angle limit $\alpha_H$ and a low angle limit $\alpha_L$. These limits are set parameters for any particular type of joint. They may be set by empirical determination or by analytical methods. One satisfactory method of determining the torque and angle limits which define the window W is disclosed in Society of Manufacturing Engineers Technical Paper No. AD86-880 which is available from SME, One SME Drive, P.O. Box 930, Deerborn, Mich. 48121. Any other suitable method of arriving at the desired torque and angle limits defining the window W may also be used in practicing the invention.

In the window W, the desired, or optimal, torque and angle values are assumed to occur exactly at the center of the window W. This is defined by the point $(T_D, \alpha_D)$. $T_D$ occurs halfway between the low torque limit and the high torque limit, and $\alpha_D$ occurs halfway between the low angle limit and high angle limit.

The low and high angle limits are measured from an origin of angle, which may occur anywhere but is preferably defined at a threshold torque $T_x$. In FIG. 2A, the point defined by the threshold torque and the origin of angle is marked by the letter "x". The threshold torque $T_x$ is selected to be in the linear range of the torque-angle characteristic curve for the fastener being tightened. In this range, the component layers 26, 28 and 30 of the joint have been clamped together sufficiently so that the rate of change of torque with respect to angle is relatively constant. Typically, the threshold torque $T_x$ is 30-60% of the desired torque, $T_D$.

In FIG. 2A, a portion V of an exemplary characteristic torque-angle curve is illustrated running from the start of rundown (i.e., from zero torque) to the threshold torque $T_x$. The curve V is merely exemplary, and could be any of a variety of shapes, depending upon the torque-angle characteristics of the particular fastener being tightened. As illustrated in FIG. 2A, the curve V starts out flat, which is a free running portion in which the fastener is run down without any significant torque, such as would be the case when the fastener 24 is run down before its head first contacts layer 26. The curve V then enters a portion with a large curvature which is caused by the joint beginning to clamp up. By the time the curve V reaches the threshold torque $T_x$, it is substantially linear. For the curve V illustrated, the slope shown is approximately equal to that of the line $k_a$, which extends above the threshold torque $T_x$. If the portion of the line $k_{cd}$ from zero torque to the threshold torque $T_x$ were illustrated, it too would start out relatively flat and have a curvature, but would straighten out to approximately the slope of the line $k_{cd}$ before reaching the threshold torque $T_x$. The same is true for the infinite number of other possible characteristic curves which could be generated when tightening ostensibly identical joints.

The fastener 24 may have to be run down through many turns before its head even comes in contact with the other components of the joint, producing a long flat region, or the joint may be extremely "soft", which produces a large curvature region. Although the measurement of angle could begin anywhere in these regions, it need not begin until after the threshold torque $T_x$ is reached, from which the low and high angle limits are measured. If angle measurement does begin sooner, it is convenient for purposes of calculation to reset the angle count to zero at the threshold torque $T_x$.

The angle limits are usually set as a certain number of degrees measured from the threshold torque $T_x$. As long as the threshold torque $T_x$ is within the linear range of the joint and torque and angle measurements must be made from at least that point, it is preferred to also start measuring torque and angle from the threshold torque $T_x$ for purposes of calculating the rate of change K of torque with respect to angle for the joint being tightened. This rate of change need not necessarily be calculated from the threshold torque $T_x$, so long as it is calculated in the linear region of the joint, i.e. above the initial curvature and below the yield point of any joint component.

It is desirable to begin measuring torque and angle at as low a torque as possible and yet insure that it will be in the linear range of the torque-angle characteristic curve for the fastener being tightened. The threshold torque $T_x$ is usually the logical starting point for calculating the torque rate K because it is normally set near the beginning and within the linear range of the joint. For purposes of calculating the rate of change K of torque with respect to angle (i.e., the torque rate K), this allows time to perform calculations "on the fly" as the fastener is being tightened, without having to stop the tightening process to allow time for calculations. The further down from the window W that the threshold torque $T_x$ can be set, the more time there will be to perform the necessary calculations, thereby avoiding any need for stopping.

Generally speaking, except for determining where the threshold torque occurs, torque and angle measurements most conveniently begin at the threshold torque for purposes of practicing the invention. The frequency of measurement of the torque and angle is somewhat subject to the discretion of the programmer, but is usually in the range of every 0.1-2.0 degrees. Sampling torque and angle measurements every 1 degree angle increment is typical.

The measured torque and angle values above the threshold torque are used to calculate the rate of change K of the torque with respect to angle for the joint being tightened. This rate of change K is known in the art as the "torque rate" of the joint and is simply the slope in the linear range of the torque-angle characteristic curve for the joint being tightened. It should be noted that this rate can be expressed in units of torque divided by angle, as is preferred herein.

Calculating the torque rate or slope K of the characteristic curve can be done in any suitable way, as is well-known in the art. For example, U.S. Pat. No. Re. 31,569 discloses one way of calculating the slope of a characteristic torque-angle curve. As is also well-known, there are many different wats for processing torque and angle data. For purposes of practicing the present invention, the torque and angle data used for calculations may be stored as raw data. Here it should be noted that FIGS. 2A-4 are schematic representations of characteristic curves, it being understood that actual data would be subject to noise. In any event, any suitable procedure for interpreting the data and calculating the slope of the torque-angle characteristic curve in the linear region may be applied in practicing the invention.

Sampling of torque and angle values for the purpose of determining the slope of the torque-angle characteristic curve for the fastener pair being tightened should be completed by the time a second threshold torque $T_y$ is reached. The second threshold torque $T_y$ is chosen to be sufficiently far below $T_D$ to allow enough time to complete final calculations to reach a target parameter value measured in units of either torque or angle. The target parameter is chosen in the preferred embodiment at a point which lies on the torque-angle characteristic curve for the fastener being tightened halfway (50% of the way) through the window W. Halfway through the window is chosen because that will usually be at the optimal final values for torque and angle, being within the window and as far as possible away from all the limits which define the window. However, the invention could be practiced defining the final parameter at any desired proportion of the way through the window along the characteristic curve, or along a projection of the characteristic curve, for the fastener being tightened.

Referring to FIG. 2A, the window W is divided into three zones $Z_1$, $Z_2$ and $Z_3$ which are defined by the values of the upper and lower torque limits, the upper and lower angle limits and the threshold torque. The first zone $Z_1$ is that subtended by the lines through the corners a and b of the window W, which lines are of the slopes $k_a$ and $k_b$, respectively. The second zone $Z_2$ is inside the window W and subtended by the lines through the corners a and c of the window W, the line through the corner c being of the slope $k_c$. The third zone $Z_3$ is that inside the window W and defined by the angle subtended by the lines through the corners c and d of window W, the line through corner d being of slope $d_d$. Which boundary lines are included by each respective zone are inconsequential, the same results being obtained regardless of which adjacent boundary lines are considered included in the zones. In the preferred embodiment, each zone includes its high boundary line, i.e., zone $Z_1$ encompasses lines of slope K wherein $k_a < K \leq k_b$, zone $Z_2$ encompasses $k_c < K \leq k_a$ and zone $Z_3$ covers $k_d < K \leq k_c$.

For the first zone $Z_1$, the lower torque limit $T_L$ is met first, before the window W is entered. The window W is not entered until after the lower angle limit $\alpha_L$ is met. Therefore the challenge is to meet the angle requirement and it is preferred under these circumstances to define the target value as an angle value, rather that a torque value.

For the second zone $Z_2$, the target value is defined in terms of torque. For the second zone, the lower angle limit $\alpha_L$ is met before the lower torque limit $T_L$ is met. The window is entered when the lower torque limit $T_L$ is met. Since the target value is a constant torque $T_D$ for this zone, it is preferred to use $T_D$ as the target value. However, it should be understood that the target parameter could also be determined in terms of angle.

For the third zone $Z_3$, the angle lower limit $\alpha_L$ is met before the lower limit of torque $T_L$ and the window W is not entered until after the lower torque limit $T_L$ is reached. Torque control is preferably used in zone $Z_3$ following the rule of thumb to control the characteristic met second (i.e., if $K > k_a$, use angle control; if $K < k_a$, use torque control; if $K = k_a$, use either torque or angle control). However, it should be understood that the target parameter could also be defined in terms of angle, although not preferred herein.

In the method discussed with respect to FIGS. 5 and 6A-L, the torque rate K for the joint being tightened is calculated and compared to the slopes $k_a$, $k_b$, $d_c$ and $k_d$ to determine which zone of the window the joint is headed for. Depending upon which zone applies, a final target parameter value is defined by a torque or an angle value which is the desired proportion, halfway in the preferred embodiment, through the window along a projection of the characteristic curve of slope K. An appropriate shut-off signal is then issued, preferably somewhat in advance of actually reaching the target parameter, to cause the fastener to stop nearer to the target parameter.

In an alternative method, the functions of the curves which define the target parameters halfway through the window W for characteristic curves of any slope destined for the window and intersecting point x are solved to determine when the shut-off command should be issued. In FIG. 2A, the functions of the halfway target curves are represented by curve bf, line fg, and curve gd. The functions for these curves are as follows:

$$\text{For curve } bf, \frac{T_i - T_x}{T_H - T_x} = \frac{(\alpha_i/\alpha_L)}{2(\alpha_i/\alpha_L) - 1} \quad (1)$$

$$\text{if } \frac{T_D - T_x}{T_L - T_x} \geq (\alpha_i/\alpha_L) \geq 1;$$

$$\text{For line } fg, T_i = T_D \quad (2)$$

$$\text{if } \alpha_H \left[ \frac{T_D - T_x}{T_H - T_x} \right] \geq \alpha_i \geq \alpha_L \left[ \frac{T_D - T_x}{T_L - T_x} \right]; \text{ and}$$

$$\text{For curve } gd, \frac{T_i - T_x}{T_L - T_x} = \frac{(\alpha_i/\alpha_H)}{2(\alpha_i/\alpha_H) - 1} \quad (3)$$

$$\text{if } 1 \geq (\alpha_i/\alpha_H) \geq \frac{T_D - T_x}{T_H - T_x};$$

where:
$T_H$ = the high torque limit;
$T_L$ = the low torque limit;
$\alpha_H$ = the high angle limit;
$\alpha_L$ = the low angle limit;
$T_x$ = the threshold torque;
$T_D = \frac{1}{2}(T_H + T_L)$;
$T_i$ = the instantaneous value of torque;
$\alpha_i$ = the instantaneous value of angle.

These equations can be solved to determine the intersection of the applicable curve and a projection of the torque-angle curve for the fastener being tightened of torque rate K, and tightening terminated at or near the determined stopping point. The intersection coordinates could be solved for based on the measured value of the torque rate K as determined at the second threshold (i.e., $T_y$) level or the calculation of the torque rate K could be periodically or continually updated to reach the target curve more precisely.

For example, characteristic curve xe of slope $k_{ab}$ in FIG. 2A terminates halfway through the window at point e on curve bf. The tool is given a command just prior to point e, taking into account tool overrun and any other delays which may be inherent in the system such as what may be caused by interpreting torque and angle values and any other desired correction or safety factors, so that the fastener stops at the final target, point e, by solving the above equation (1) for curve bf to determine the point of intersection of curve bf and line xe. This point of intersection defines a target angle which can be used in angle control, which is the preferred control in this zone. Similarly, any characteristic curve originating at point x and having a slope less than or equal to $k_a$ and greater than $k_c$ is made to terminate on the line fg, taking into account the delay factors discussed above, by determining when $T = T_D$. In the same vein, equation (3) for curve gd can be applied to lines such as xh of slope $k_{cd}$ in which $k_d < k_{cd} \leq k_c$ to terminate tightening on or around curve gd by determining the intersection of curve gd and such line of slope K, where $k_d < K \leq k_c$.

Not every fastener will have a sampled value of torque exactly equal to the threshold torque $T_x$. Rather, because the angular location of sampling the torque value may not exactly coincide with the angular location of the set value of the threshold torque, the threshold torque $T_x$ is redefined as the actual instantaneous value $T_i$ when the sampled torque is first greater than or equal to the set value of the threshold torque. Thus, the redefined value of the threshold torque may be slightly closer to the window than the set threshold torque. Therefore, any particular characteristic curve may not exactly originate from the set threshold torque, but from the first sampled torque which is greater than the set threshold torque. As a result, the curves bf and gd may be slightly shifted and the length of the line fg slightly changed.

Figure 3:
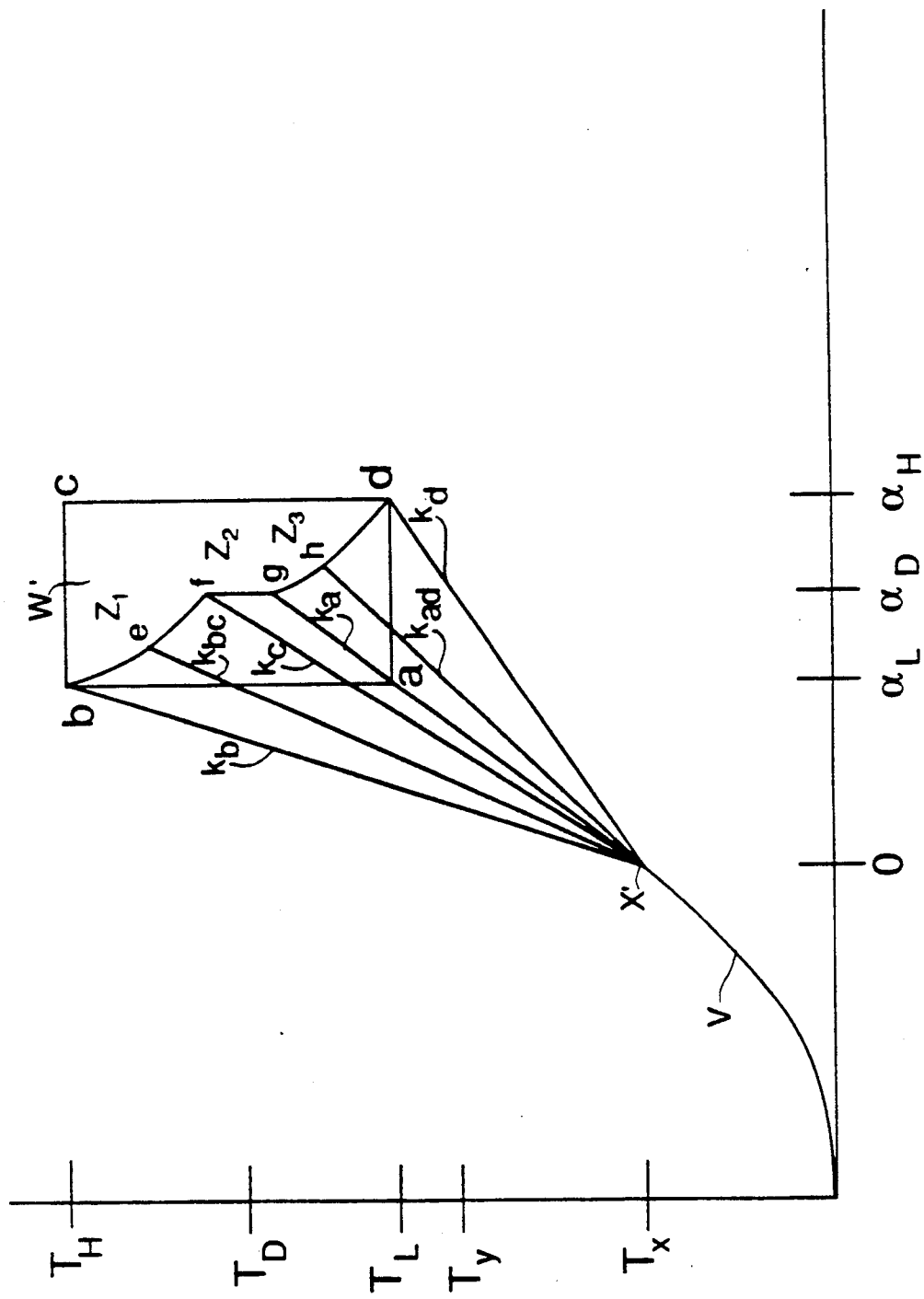
FIG. 3 is an illustration similar to FIG. 2A, but showing a torque-angle specification window of a different size and shape.

FIG. 2A only illustrates one possible shape for the window W. Another possible shape designated W' is illustrated in FIG. 3. The window W' is vertically elongated, rather than horizontally elongated as is window W in FIG. 2A. The shape of the window is, of course, determined by the fastener tightening specifications, which may be determined in any suitable manner, as discussed above. The shape of the window in FIG. 2A, in which $k_a > k_c$ is referred to herein as "torque-dominated" and the shape of the window in FIG. 3, in which $k_c > k_a$ is referred to herein as "angle-dominated".

Like the window W, the window W' is also divided into three zones. Here, the slope $k_c$ of the line x'f intersecting corner c of window W' is greater than the slope $k_a$ of the line x'g intersecting corner a of the window W'. Thus, the first zone $Z_1$ of the window W' is that within the window W' and subtended by the lines x'b and x'f having slopes of $k_b$ and $k_c$, respectively. Any characteristic curve having a calculated slope K in the range of $k_b$ and $k_c$, such as the curve x'e of slope $k_{bc}$, falls within the first zone $Z_1$ and is made to terminate approximately on target curve bf by either of the methods discussed above. Since the lower torque limit is met before the lower angle limit, the target value is preferably defined in terms of angle, although it could be defined in terms of torque.

The second zone $Z_2$ of window W' is that occurring within the window and subtended by the lines x'f and x'g having the slopes $k_c$ and $k_a$, respectively. Again in this zone, the lower torque limit is met before the angle limit and so angle control is preferably used, although torque control could also be used. In addition, in this zone, the target angle is simple defined as $\alpha_D$, the midpoint of the angle limits.

The third zone $Z_3$ of window W' is that area within the window W' which is subtended by the lines x'g and x'd having the slopes $k_a$ and $k_d$, respectively. Any line of a slope within the range of $k_a$ and $k_d$ such as line x'h of slope $k_{ad}$ will be made to terminate halfway through the window W' approximately on the line gd.

For the window W', the target curves bf, fg and gd are defined by the following equations:

$$\text{For curve } bf, \frac{T_i - T_x}{T_H - T_x} = \frac{(\alpha_i/\alpha_L)}{2(\alpha_i/\alpha_L) - 1} \quad (4)$$

$$\text{if } \alpha_D \geq \alpha_i \geq \alpha_L;$$

$$\text{For line } fg, \alpha_i = \alpha_D \quad (5)$$

-continued $$\text{if } (T_H - T_x)\left[\frac{\alpha_D}{\alpha_H}\right] \geq T_i - T_x \geq (T_L - T_x)\left[\frac{\alpha_D}{\alpha_L}\right];$$

For curve $gd$, $\dfrac{T_i - T_x}{T_L - T_x} = \dfrac{(\alpha_i/\alpha_H)}{2(\alpha_i/\alpha_H) - 1}$ (6)

if $\alpha_H \geq \alpha_i \geq \alpha_D$;

where $\alpha_D = \frac{1}{2}(\alpha_H + \alpha_L)$, and all the other variables are as defined above. Note that the equations for the corner curves bf and gd are the same as for FIG. 2A, although with different boundaries.

Figure 4:
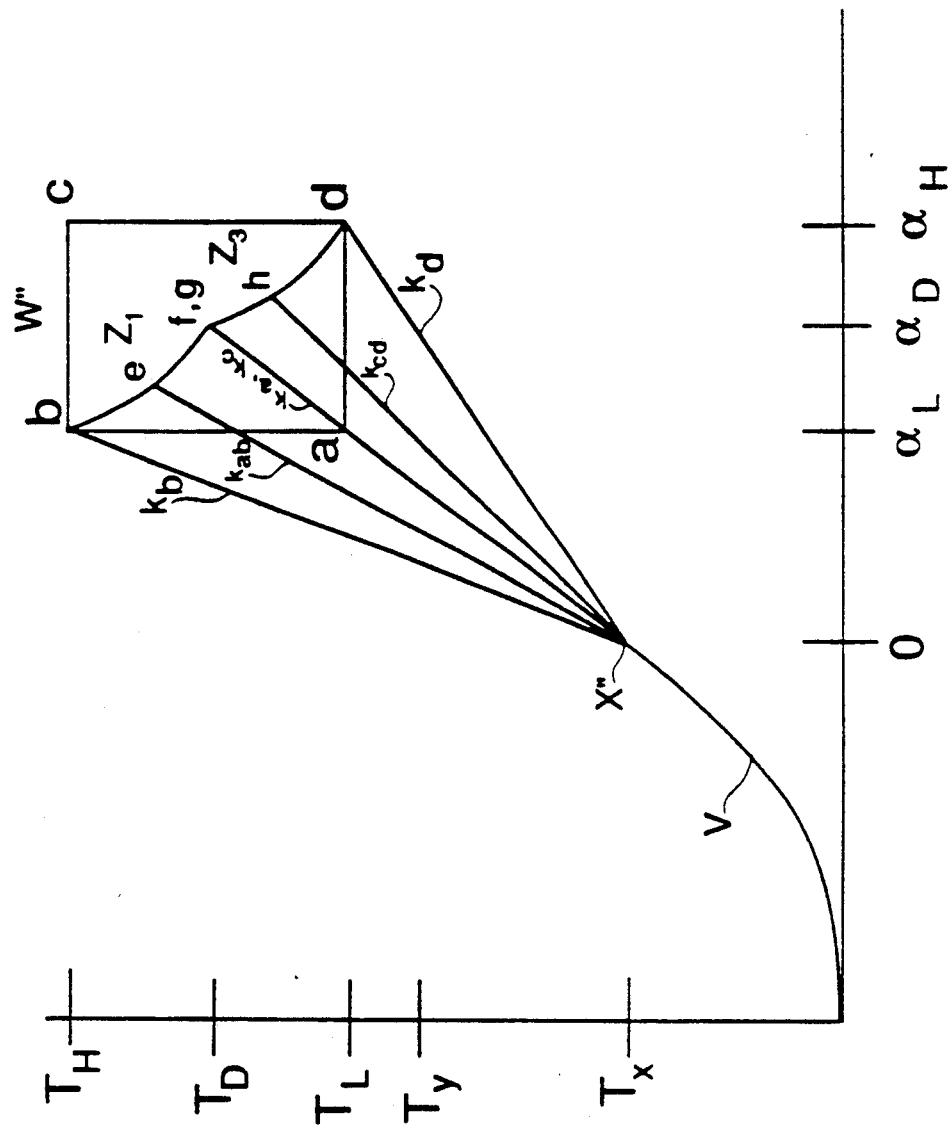
FIG. 4 is an illustration similar to FIG. 2A, but showing another torque-angle specification window of a different size and shape.

Yet another relationship between the window and the threshold torque is possible, and that is illustrated by the window W''' in FIG. 4. Here, the window W''' is divided into only two zones. The zone $Z_2$ in the two former cases of FIGS. 2 and 3 in which one of the target values was a constant does not exist in FIG. 4. Here, target curves bf and gd intersect at point f,g. The slope of the line x''a and the line x''c is the same. The window W''' is divided into two zones $Z_1$ and $Z_3$ by a line of slope $k_a = k_c$, which intersects corners a and c. Any characteristic curve falling within the window and having a calculated slope greater than the slope of a line between corners a and c is made to terminate on the target curve bf, and any characteristic curve having a calculated slope less than the slope of the line between corners a and c is made to terminate on the target curve gd. Thus, all the characteristic curves falling within or on the boundaries of the window W''' are made to terminate either at the corners b and d or along the curve halfway through the window W''' approximately on the curves bf and gd connecting corners b and d. The equations for lines bf and gd in FIG. 4 are as defined above with reference to FIGS. 2A and 3.

Thus far, only joints having characteristic curves which fall within the torque-angle window have been considered. However, some joints may initially start out with a slope greater than $k_b$ or less than $k_d$ such that the early indications from the calculated slope of the characteristic curve indicate that the window will be missed. In these situations, the joint may subsequently elicit nonlinear behavior such that the slope of the characteristic curve changes to put the final stopping point inside the torque-angle specification window. In those cases, needless rejects would be created if tightening was terminated based solely on the initial calculation of the slope for the characteristic curve.

Because of this phenomenon, the present invention contemplates proceeding with tightening even if the calculated slope of the characteristic curve indicates that the curve will miss the window, so long as the deviation from the window is not excessive. Thus, a high slope limit $k_H = (1+\epsilon)k_b$ is defined and a low slope limit $k_L = (1-\epsilon)k_d$ is defined. If the calculated slope of the characteristic curve is greater than $k_H$ or less than $k_L$, tightening is terminated immediately. If the prediction based on the calculated slope of the curve is that the curve will miss the window but the slope is less than the high slope limit and greater than the low slope limit, tightening is continued to give the joint the benefit of the doubt that the final stopping point will end up in the window.

As discussed above, the rule of thumb for defining the target value is that the target value is preferably defined in terms of the characteristic for which the lower limit of the characteristic will be met second. Thus, if a characteristic curve is predicted to meet the lower torque limit second, then the target value is defined in terms of torque. If a characteristic curve is predicted to meet the lower angle limit after meeting the lower torque limit, then the target value is defined in terms of angle.

Referring to FIGS. 2 and 4, i.e., if $k_a \geq k_c$, the target parameter values halfway through the window expressed in terms of angle, $\alpha_t$, or expressed in terms of torque, $T_t$, can be determined according to the applicable zone using the following equations:

For characteristic curves directed for zone $Z_1$ ($k_a < K \leq k_b$):

$$\text{Using angle control, } \alpha_t = \frac{1}{2}\left[\alpha_L + \frac{T_H - T_x}{K}\right]. \quad (7)$$

For characteristic curves directed for zone $Z_2$ ($k_c < K \leq k_a$) (reduced to a single line in FIG. 4):

$$\text{Using torque control, } T_t = T_D. \quad (8)$$

For characteristic curves directed for zone $Z_3$ ($k_d < K \leq k_c$):

$$\text{Using torque control, } T_t = \tfrac{1}{2}[K\alpha_H + T_x + T_L]. \quad (9)$$

Wherein
$\alpha_t =$ the target parameter value expressed in terms of angle;
$T_t =$ the target parameter value expressed in terms of torque;
$k_a =$ the rate of change of torque with respect to angle of a line from the threshold torque to the intersection of the low angle limit and the low torque limit;
$k_b =$ the rate of change of torque with respect to angle of a line from the threshold torque to the intersection of the low angle limit and the high torque limit;
$k_c =$ the rate of change of torque with respect to angle of a line from the threshold torque to the intersection of the high angle limit and the high torque limit;
$k_d =$ the rate of change of torque with respect to angle of a line from the threshold torque to the intersection of the high angle limit and the low torque limit;
and the other variables are as defined above.

Referring to FIG. 3, and which could also be applied to FIG. 4, i.e., if $k_a \leq k_c$, the target parameter values expressed in terms of angle, $\alpha_t$, can be determined according to the applicable zone using the following equations:

For characteristic curves directed for zone $Z_1$ ($k_c < K \leq k_b$):

$$\text{Using angle control, } \alpha_t = \frac{1}{2}\left[\alpha_L + \frac{T_H - T_x}{K}\right]. \quad (10)$$

For characteristic curves directed for zone $Z_2$ ($k_a < K \leq k_c$) (reduced to a single point in FIG. 4):

$$\text{Using angle control, } \alpha_t = \alpha_D. \quad (11)$$

For characteristic curves directed for zone $Z_3$ ($k_d < K \leq k_a$):

$$\text{Using torque control, } T_t = \tfrac{1}{2}[K\alpha_H + T_x + T_L]. \quad (12)$$

If optimal targets other than those corresponding to halfway through the window were desired for any of the above equations (e.g., two-thirds of the way through the window), the one-half ($\frac{1}{2}$) factor could be changed to that proportion (in the example, to $\frac{2}{3}$) and $T_D$ and $\alpha_D$ would be calculated using that proportion rather than one-half.

Also as discussed above, the tool is given a command to stop before the target value is actually reached to take into account the delay in stopping leading to tool overrun in addition to any other delays or correction factors which may be desired to make the tool stop at the target parameter value. The tool overrun is defined in terms of the angle through which the fastener rotates after the stop command is given. This is caused by the time it takes for the solenoid 16 to stop the flow of air to the nutrunner 12 and to some extent by the inertia of the nutrunner 12.

The invention contemplates customizing one value of tool overrun for the situation in which the target parameter value is defined in terms of torque, designated hereinafter as "torque control", and customizing another value of tool overrun for the situation in which the target parameter value is defined in terms of angle, hereinafter designated "angle control". The reason for this is that when using torque control, changes in the slope of the characteristic curve near the final stopping point can be accounted for to provide a more accurate value of torque over-shoot created by the tool overrun.

The fastener tightening strategy of the present invention is controlled by a program running on the spindle module 34. While the fastener is being tightened, the spindle module 34 receives torque and angle input data from the nutrunner 12 which is processed by the program running on the spindle module 34.

Figure 5:
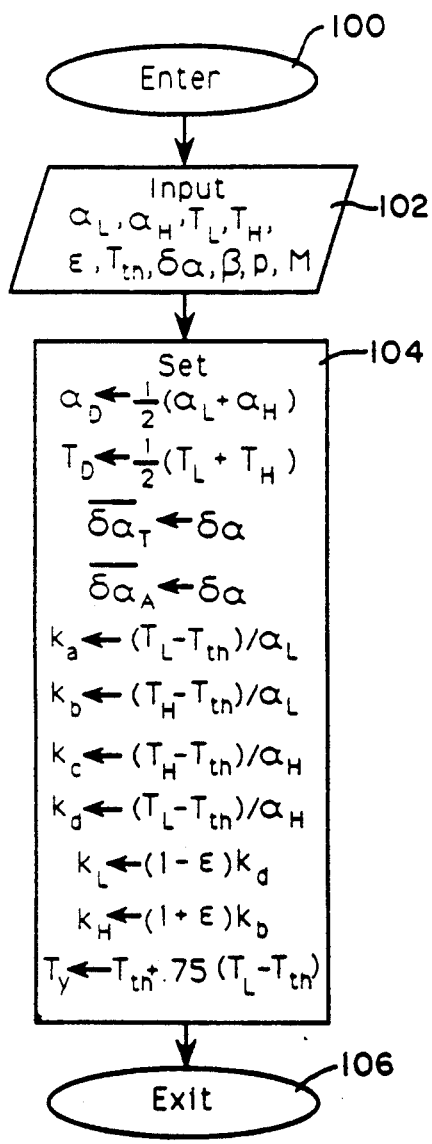
FIG. 5 is a flow chart illustrating an initialization routine for the flow chart of FIGS. 6A-L.

Initial parameters of the program are input by an operator through terminal 40. FIG. 5 illustrates a flow chart for the initialization routine. The initialization routine is entered as indicated by symbol 100 and the operator inputs values for the low angle limit $\alpha_L$, the high angle limit $\alpha_H$, the low torque limit $T_L$, the high torque limit $T_H$, the reject correction factor $\epsilon$, the set value of threshold torque $T_{th}$, tool overrun $\delta\alpha$, a tool overrun weighting factor $\beta$, the angular sampling frequency, p, expressed in terms of degrees, e.g., 1°, and an angular execution margin M expressed in terms of degrees, in the preferred embodiment. For electric tools, the angular execution margin M is about 1° and for air tools it usually lies in the range of 2-7°. The introduction of M serves to produce a better chance of ending up within the window. These inputs are indicated in input block 102.

From these input values, a number of process values are determined, as indicated in process block 104. One of these process values is the desired angle, $\alpha_D$, which is set as the average of the high and low angle limits, i.e. halfway between the high and low angle limits. Another predetermined process value is the desired torque, which is the average of the high and low torque limits, i.e. halfway between the high and low torque limits. The input value of the tool overrun $\delta\alpha$, is also set equal to a torque control tool overrun value $\delta\alpha_T$ and to an angle control tool overrun value $\delta\alpha_A$.

The values of the slopes $k_a$, $k_b$, $k_c$ and $k_d$ of the lines for reaching the four corners a, b, c, d of the torque-angle specification window are also determined in process block 104, using the following equations:

$$k_a = \frac{T_L - T_{th}}{\alpha_L} ; \quad (13)$$

$$k_b = \frac{T_H - T_{th}}{\alpha_L} ; \quad (14)$$

$$k_c = \frac{T_H - T_{th}}{\alpha_H} ; \text{ and} \quad (15)$$

$$k_d = \frac{T_L - T_{th}}{\alpha_H} . \quad (16)$$

As discussed above, the slopes $k_a$, $k_b$, $k_c$ and $k_d$ divide the torque-angle specification window into two or more zones. The window is divided into two zones if $k_b$ equals $k_c$. Otherwise, it is divided into three zones. The lines intersecting the corners of the window may be considered a part of any neighboring zone. As will be apparent from the description below, each zone generally includes all characteristic curves having a calculated slope between the boundary slopes which define the zone and also the slope of the higher adjacent boundary. Thus, in FIG. 2A zone $Z_1$ includes all characteristic curves having a calculated slope between $k_a$ and $k_b$ and also $k_b$. Zone $Z_2$ encompasses all characteristic curves having a calculated slope between $k_a$ and $k_c$ and also the slope $k_a$. Zone $Z_3$ includes all characteristic curves having a calculated slope between $k_c$ and $k_d$ and also the slope $k_c$. It should be understood however, that each boundary could be included by either adjacent zone.

The low and high slope limits $k_L$ and $k_H$, respectively, are also determined in process block 104 according to the following equations:

$$k_L = (1-\epsilon) k_d \quad (17)$$

$$k_H = (1+\epsilon) k_b \quad (18)$$

Figure 2B:
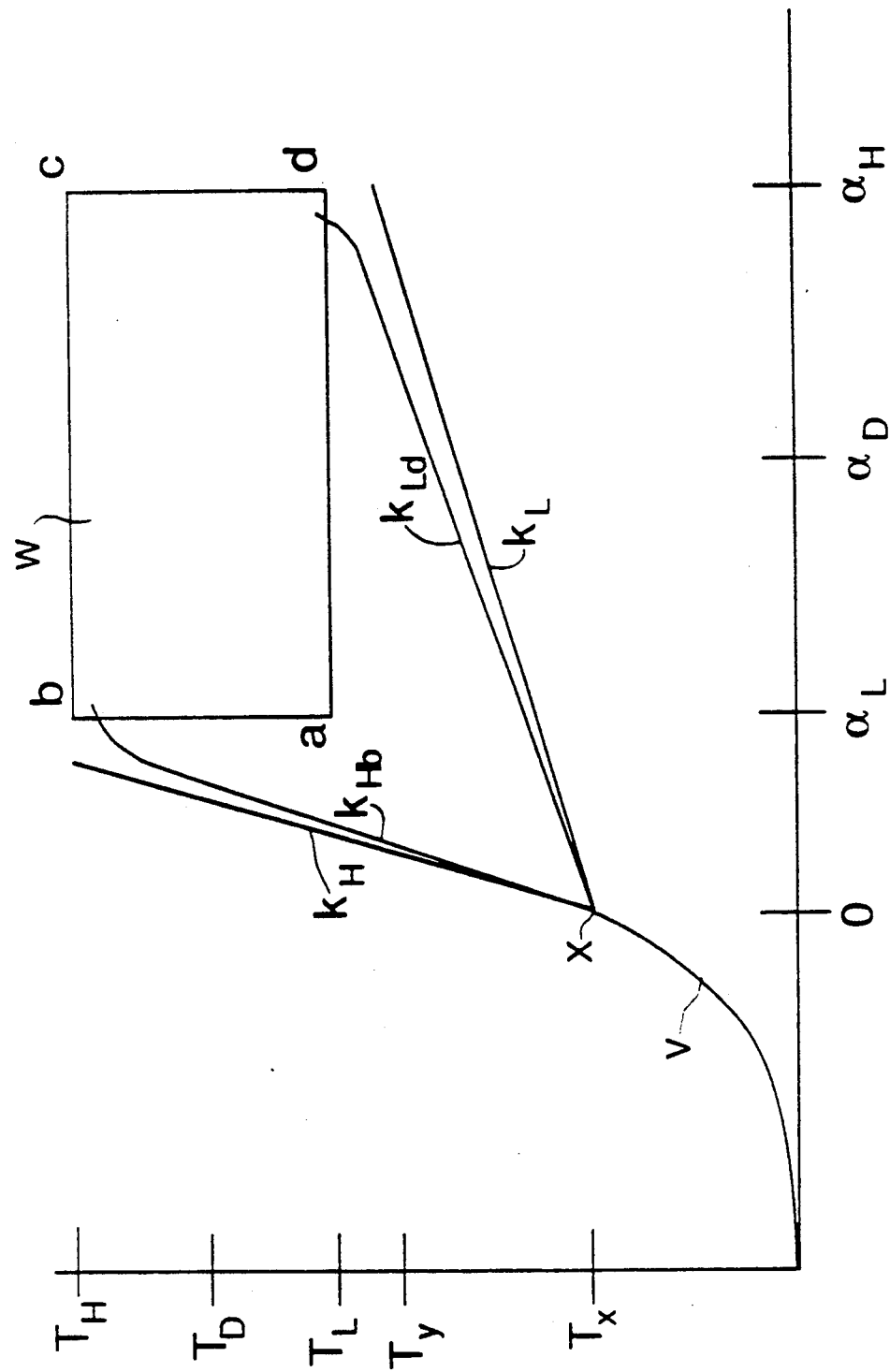
FIG. 2B is an illustration of the torque-angle specification window of FIG. 2A and also showing high and low slope limits, with graphical representations of torque-angle characteristic curves which are inside the envelope of the high and low slope limits but have an initial slope outside of the slope envelope of the window, and which display a favorable non-linearity near the end of their tightening cycles.

The reason for introducing the high and low slope limits is to take advantage of favorable nonlinearities which a joint may exhibit subsequent to the torque rate k calculation. Although the calculated torque rate k of a characteristic curve may be somewhat outside of the slopes subtended by $k_b$ and $k_d$, which define the envelope of the window W, the joint may exhibit nonlinear behavior as illustrated in FIG. 2B by the curve of slope $k_{Hb}$ which is between $k_H$ and $k_b$ and the curve of slope $k_{Ld}$ which is between $k_L$ and $k_d$. In these curves, the final stopping point for the joint ends up inside the torque-angle specification window because the curve takes a favorable turn near its end. In these cases, the joint should not be rejected if the calculated slope for the joint is somewhat outside the envelope defined by the window. Rather, tightening should continue as long as the slope is not too far out of the envelope of the window, to give the joint the benefit of the doubt that it will come into the window eventually.

The degree that the calculated slope may be outside of the $k_b$ to $k_d$ envelope is set by the reject rate margin $\epsilon$. The reject rate margin $\epsilon$ is determined by inspection or empirically, a typical value being 0.20. Thus, as long as the calculated slope for any characteristic curve is greater than or equal to the low slope limit $k_L$ and less than or equal to the high slope limit $k_H$, tightening will continue. If the calculated slope is outside of the $k_H$ to $k_L$ envelope, then it is reasonable to assume that the window will be missed and tightening will be terminated immediately.

The last variable which is set in process block 104 is the second threshold value $T_y$, which is used to determine the slope of the characteristic curve for the fastener being tightened. The second threshold torque $T_y$ is chosen to be in the linear region of the characteristic curve a distance above the set threshold torque $T_{th}$ to give an accurate indication of the torque rate but a sufficient distance away from the window to allow time for subsequent calculations. The value chosen for the second threshold torque $T_y$ in the preferred embodiment occurs 75% of the way between the set threshold torque $T_{th}$ and the low torque limit $T_L$. Thus, the second threshold torque $T_y$ is determined by the following formula, as shown in process block 122:

$$T_y = T_{th} + 0.75(T_L - T_{th}) \tag{19}$$

The initialization routine can then be exited via exit block 106.

This initialization need only be done once for any particular joint design and desired characteristics. These input and determined process values are held in nonvolatile RAM memory to be used in the tightening program for each particular fastener. For a joint of a different design or for different desired parameters, different parameters are set in input block 102 to reinitialize the program for the new joint design or new tightening parameters.

FIGS. 6A–L illustrate a flowchart of a program for practicing a fastener tightening control strategy of the invention. The program is entered via entry block 110 and the tool is started in process block 112. It should be noted that there may be many preliminary checks which may be performed by the program in the process of starting the tool which are not illustrated. However, these are well-known in the art and incorporated in a subroutine which is separate from the strategy of the invention. For example, the ProSpec 6000 is programmed to include a tool starting subroutine used preliminary to other tightening strategies which may be used in practicing the strategy of the present invention. Other commercially available fastener tightening systems also have such subroutines and any suitable one may be used. These subroutines check for such things as whether the start button of the tool has been released, the position of the tool, etc., which are generic to all tightening strategies and not specific to the present invention.

It should be noted that the start tool command can be triggered automatically in response to sensing the tool engaging the fastener or in response to an operator command, which would be given after the operator has manually engaged the tool with the fastener. The operator command in this instance may come from a button located on the tool.

Figure 6A:
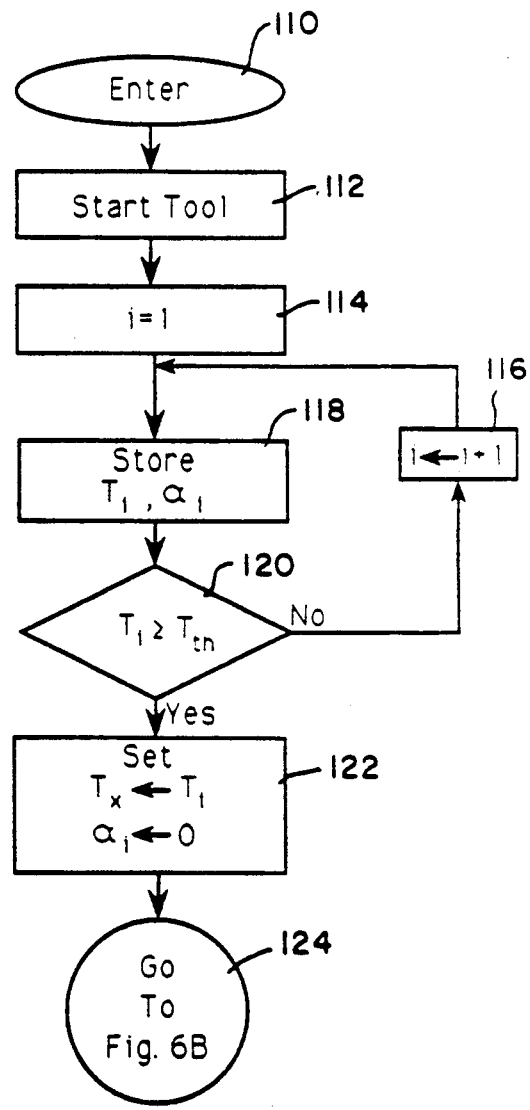

In process block 114 of FIG. 6A, a control character i is set equal to 1. i indicates the number of torque values which have been sampled, and its magnitude indicates the angle value, since the angle value is the product of i and the sampling frequency, p. Each time a new torque value has been sampled, i is incremented, as shown in process block 116.

Process block 118 is for the step of storing each set of values of the instantaneous torque, $T_i$, and the instantaneous angle $\alpha_i$ for subsequent processing. It should be noted that the count i could only be stored, since it has a direct relationship with angle because i gets incremented for every angle pulse p from the origin of angle. Hence, $\alpha_i = ip$, where i is the count from the origin of angle. Since that is the case, only the instantaneous torque $T_i$ and the count i need be stored. However, the instantaneous angle $\alpha_i$ rather than the count i is referred to herein for clarity of description since it is the physical quantity which i represents.

It should also be noted that the flowchart of FIGS. 6A–6L contemplates storing all of the sampled torque and angle values for each characteristic curve. This may be desirable in case a complete plot of the torque-angle characteristic curve for the fastener being tightened is desired, or for other subsequent data analysis. However, it is not necessary to store all of the torque and angle values for each characteristic curve for purposes of practicing the invention, as discussed above.

After storing the instantaneous values of torque (and the value of i representative of angle $\alpha_i$, as discussed above), a decision is made in decision block 120 as to whether the instantaneous torque value $T_i$ is greater than or equal to the set threshold value of torque $T_{th}$. As discussed above, the set threshold value of torque $T_{th}$ is an input parameter which is normally set to be approximately 30–60% of the desired torque $T_D$. The set threshold torque $T_{th}$, which is distinguished from the actual threshold torque $T_x$, is chosen to be in the linear range of the characteristic curve and far enough away from the specification window to allow time for calculations. If the instantaneous value of torque $T_i$ is not greater than or equal to the set threshold torque $T_{th}$, sampling and deciding is continued.

If the current value of torque as determined in decision block 120 is greater than or equal to the threshold value of torque, then a number of process variables are set in process block 122. Since $T_i$ may not be exactly equal to the threshold torque $T_{th}$ but may be slightly greater than the threshold torque, the instantaneous torque value $T_i$ is set equal to the actual threshold torque $T_x$. The actual threshold torque $T_x$ is used to calculate the torque rate K rather than the set value $T_{th}$ for calculation accuracy.

The attainment of the set threshold torque $T_{th}$ also triggers resetting the angle measurements so that the origin of angle begins at the data point where the measured torque equals or exceeds the threshold torque $T_{th}$. This is represented in process block 122 by setting $\alpha_i$ equal to zero.

Figure 6B:
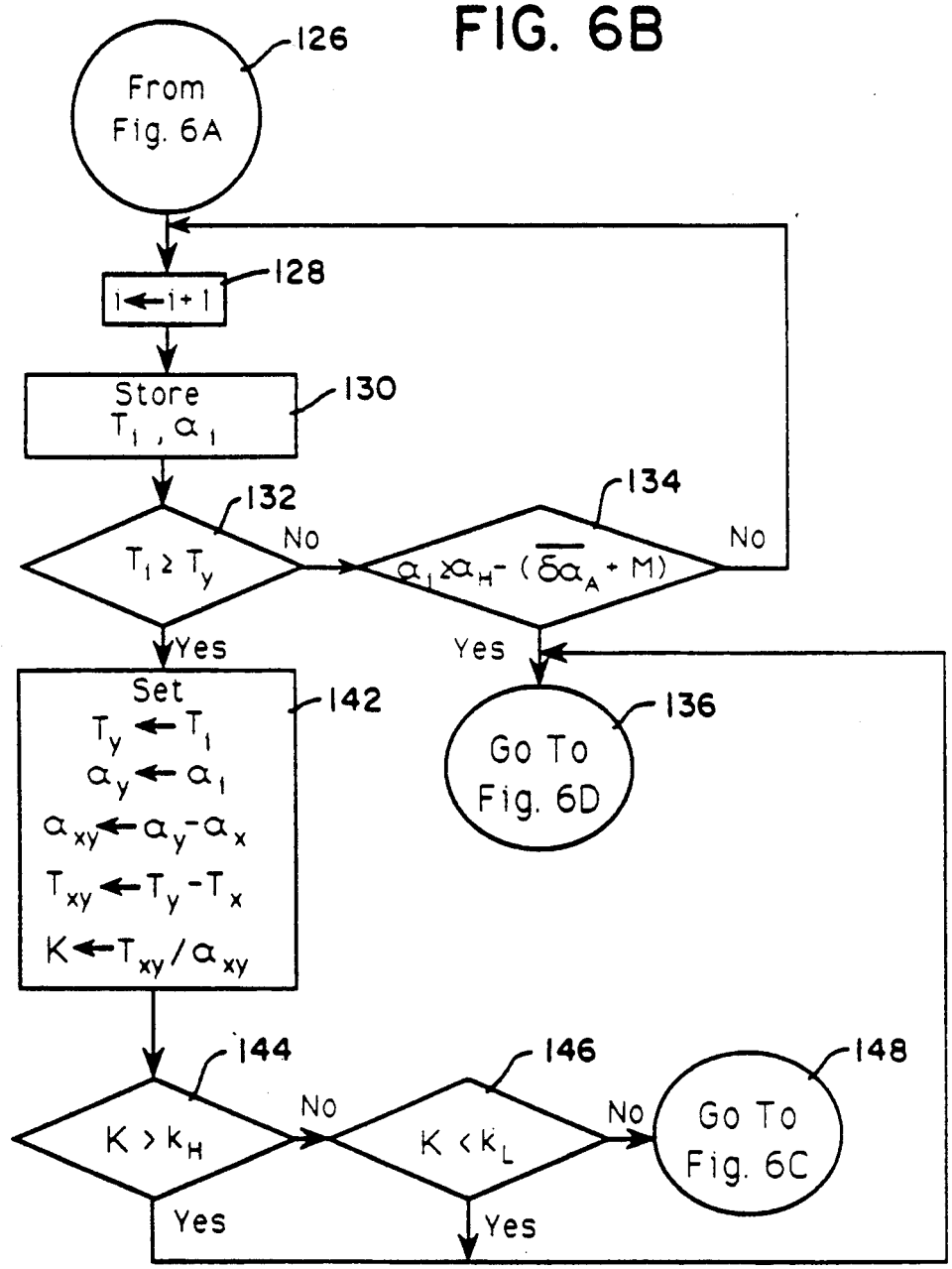

FIG. 6A flows to FIG. 6B as shown by signs 124 in FIG. 6A and 126 and FIG. 6B. As shown in process blocks 128 and 130 in FIG. 6B, torque and angle value sampling continues and in process block 132 the decision is made as to whether the current instantaneous torque value $T_i$ is greater than or equal to the second threshold torque $T_y$. If it is not, a check is made in block 134 as to whether the current angle value is greater than or equal to the high angle limit $\alpha_H$ less the tool overrun $\delta\alpha_A$ and the angular execution margin M. If the current angle $\alpha_i$ is not greater than or equal to the high angle limit $\alpha_H$ as adjusted, sampling continues. If the adjusted high angle limit has been equalled or exceeded, then, via block 136, a stop command is issued and the routine continues to determine whether the joint is good or bad, according to FIG. 6D as described below.

Referring back to decision block 132, if the instantaneous torque value $T_i$ is greater than or equal to the second threshold torque $T_y$, then the program proceeds to calculate the slope of the characteristic curve in process block 142 for the joint being tightened. Here the actual value of the instantaneous torque is substituted for the calculated value of the second threshold torque $T_y$ for reasons similar to the reasons described above as to why the actual threshold torque $T_x$ is used rather than the set threshold torque $T_{th}$ to calculate the torque rate K. In addition, the instantaneous angle value is set equal to $\alpha_y$ and the difference between $\alpha_x$ and $\alpha_y$, $\alpha_{xy}$, is calculated, as well as the difference between the actual torque values $T_x$ and $T_y$, which is set equal to $T_{xy}$. The slope K of the characteristic curve is then set equal to the actual torque difference $T_{xy}$ divided by the actual angle difference $\alpha_{xy}$.

In this approach of calculating the slope K of the characteristic curve, only two points are chosen along the characteristic curve to calculate the slope. However, it should be understood that there are many ways well-known in the art for calculating the slope of a characteristic torque-angle curve which is generated when tightening a fastener. For example, the slope K could be calculated using four points, six points or any number of points for a better representation of the slope in the case of noise and or nonlinearity. If four points were used, the slope $K_4$ could be determined using the following formula:

$$K_4 = 0.9 K_{4-1} + 0.1 K_{3-2} \qquad (20)$$

where $K_{4-1}$ is the slope between the first and the fourth points calculated using the two point technique and $K_{3-2}$ is the slope between the second and the third points using the two point technique. Similarly, the slope $K_6$ for a six point rate could be determined using the following formula:

$$K_6 = 0.714 K_{6-1} + 0.257 K_{5-2} + 0.29 K_{4-3} \qquad (21)$$

where $K_{6-1}$ is the slope calculated using the two point technique between the first and the sixth points, $K_{5-2}$ is the slope between the second and the fifth points using the two point technique and $K_{4-3}$ is the slope between the fourth and the third points using the two point technique. Of course, the slope could be determined using any other suitable method.

Having determined the slope or torque rate K, the decision can now be made as to whether tightening should continue. As discussed above, if the calculated torque rate is either greater than the high slope limit $k_H$ (decision block 144) or less than the low slope limit $k_L$ (decision block 146), then it is predicted that the window will be missed, the bad joint flag is set in process block 136, tightening is terminated in process block 138 and the program is exited in block 140. If the calculated slope K is on or inside the $k_H$ to $k_L$ envelope, then tightening is continued and the flowchart continues at FIG. 6C as shown by blocks 148 in FIG. 6B and 150 in FIG. 6C. It should be understood that other flags could also be set, other than just "bad joint", such as "torque rate high", "high angle", "low torque", etc., depending on the degree of detail desired in reporting rejects.

It is next determined in decision block 152 as to whether the calculated slope is on or inside of the high slope envelope defined by the high slope limit $k_H$ and the slope $k_b$ to corner B of the window. If the calculated slope is on or inside the high slope envelope, then the control mode flag CMF is set equal to one, because, applying the rule of thumb to control the characteristic the low limit of which will be met second, angle control will be used. Next, in process block 156 the count i is incremented and in block 158 new instantaneous torque and angle values are stored. If the instantaneous angle value $\alpha_i$ is greater than or equal to the low angle limit plus the angle execution margin M and minus the average angle overrun $\delta\alpha_A$, tightening is terminated immediately, See FIG. 6D, and it is determined whether the final torque and angle values are inside the window, as described below. The execution margin M is added to the low angle limit $\alpha_L$ to insure that the final stopping point is not on the low side of the low angle limit. If the low angle limit $\alpha_L$, as adjusted, has not yet been reached or exceeded as determined in decision block 160, then the flowchart proceeds to decision block 162.

The purpose of decision block 162 is to insure that the high torque limit is not exceeded. For example, if the joint does not exhibit favorable nonlinearity so that it never turns into the window, then tightening will be terminated because of the satisfaction of decision block 162. Decision block 162 insures that the shut off command will be given prior to the actual attainment of the high torque limit $T_H$. It does this by issuing the shut off command (see FIG. 6D) if the instantaneous torque value $T_i$ is greater than or equal to the high torque limit $T_H$ less the torque control tool overrun $\delta\alpha_T$ and the execution margin M. These components, expressed in terms of angle, are multiplied by the slope K to express the correction in terms of torque and then subtracted from the high torque limit $T_H$ to determine whether tightening should be terminated.

The torque control tool overrun $\delta\alpha_T$ is initially equal to the set parameter tool overrun $\delta\alpha$, which is empirically determined. As the program gains experience with a particular type of joint, the torque control tool overrun $\delta\alpha_T$ is adjusted to more accurately account for the tool overrun in the torque control mode. This is described in more detail below with reference to FIG. 6J.

The angular execution margin M is included in block 162 to insure that the high torque limit $T_H$ is not exceeded to avoid rejecting the joint. If either the instantaneous angle value $\alpha_i$ or the instantaneous torque value $T_i$ reaches or exceeds the limits set in decision blocks 160 and 162, then the program flows to FIG. 6D as indicated by signs 164 and 166.

Figure 6C:
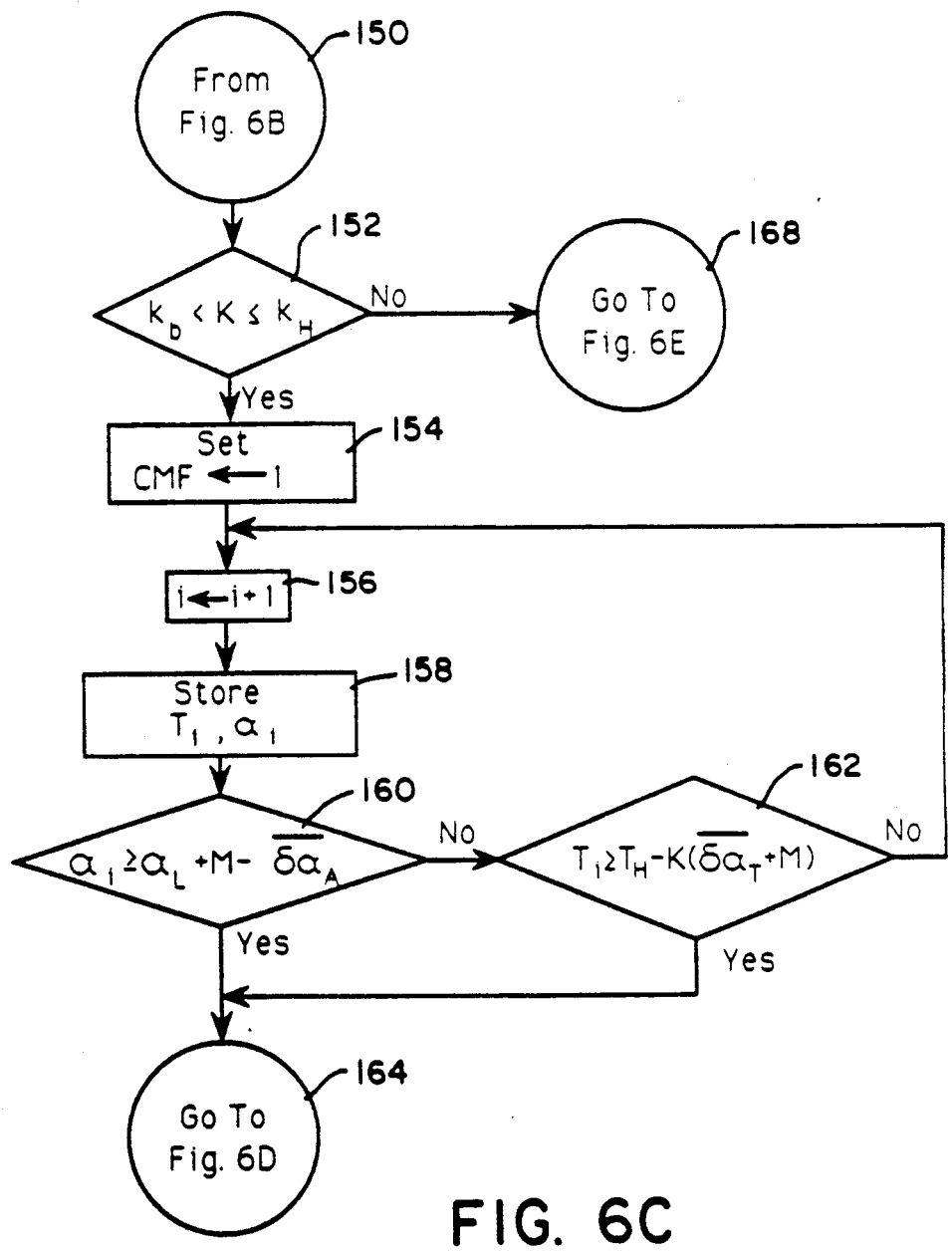

Referring back to decision block 152 of FIG. 6C, if the slope K for the fastener being tightened is not in the high slope envelope ($k_b < K \leq k_H$), then decision block 152 directs the program to proceed to FIG. 6E (signs 168 and 170). Decision block 172 of FIG. 6E determines whether the slope is on or inside of the low slope envelope defined by the line of slope $k_d$ intersecting corner d of the window and the low limit of slope $k_L$. If the slope K is on or inside the low slope envelope, then torque control will be used in the preferred embodiment for the reasons discussed above and the control mode flag CMF is set to zero in process block 174. The count i is incremented in block 176 and new instantaneous values of torque and angle (corresponding to the number i of torque values from the threshold torque $T_x$) are stored in block 178 for subsequent processing.

Decision block 180 is a check to determine whether the instantaneous torque value $T_i$ is greater than or equal to the low torque limit $T_L$, as adjusted for the execution margin M and the torque control tool overrun $\delta\alpha_T$. If it is, then tightening is terminated as described below with reference to FIG. 6D. If the instantaneous torque $T_i$ does not equal or exceed the low torque limit $T_L$ as adjusted, then process block 182 determines whether the instantaneous angle value $\alpha_i$ exceeds the high angle limit $\alpha_H$, as adjusted for the execution margin M and the angle control tool overrun $\overline{\delta\alpha_A}$. If it does, then the program is directed to FIG. 6D by block 184 and tightening is terminated as described with reference to FIG. 6D. If the instantaneous angle $\alpha_i$ does not exceed the high angle limit $\alpha_H$ as adjusted, then tightening continues incrementing the count i, storing instantaneous values for torque and angle, etc., around the loop as indicated in FIG. 6E.

A delay factor is included in process block 182 analogous to the two part delay factor discussed with reference to process block 162 of FIG. 6C. Decision block 182 is provided so that in case the joint does not exhibit the favorable nonlinearity which would cause the final stopping point to be inside the window, then tightening is terminated so that the high angle limit will not be exceeded.

The delay component M indicated in process block 182 is the same as that described above with respect to process block 162. The delay component angle control tool overrun $\overline{\delta\alpha_A}$ is analogous to the torque control tool overrun $\overline{\delta\alpha_T}$ used in process block 162, but may be somewhat different in value. Like the torque control tool overrun, the angle control tool overrun $\overline{\delta\alpha_A}$ starts out initialized to the value of the input tool overrun $\delta\alpha$, which is empirically determined. However, the angle control tool overrun $\overline{\delta\alpha_A}$ is adjusted as the program gains experience with the particular fastening operation to more accurately reflect the true tool overrun being experienced when angle control is used. The adjustments made to the angle control tool overrun $\overline{\delta\alpha_A}$ are described with reference to FIG. 6J. If the condition stated in decision block 182 is satisfied, then block 184 directs the termination of tightening according to FIG. 6D, as described below.

Figure 6F:
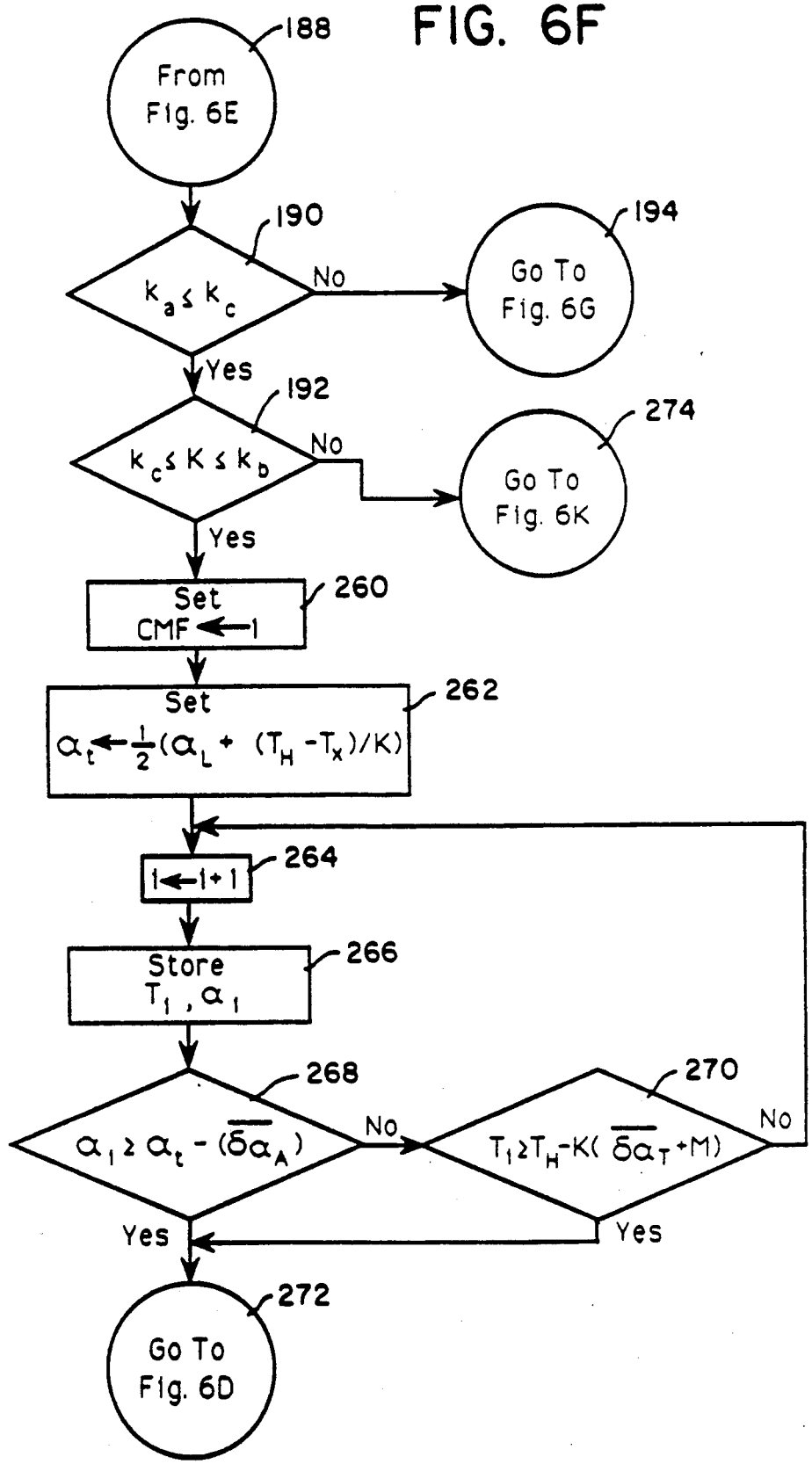

If the calculated slope K for the fastener being tightened is not on or inside the low slope limit envelope, then process block 172 directs the program to FIG. 6F as indicated by directives 186 of FIG. 6E and 188 of FIG. 6F. Decision block 190 begins to determine which of the cases illustrated in FIGS. 2A, 3 and 4 the particular fastener being tightened is exhibiting. If $k_a$ is less than or equal to $k_c$ as illustrated in FIGS. 3 and 4, then the program proceeds to decision block 192. If $k_a$ is greater than $k_c$ as illustrated in FIG. 2A, then the program proceeds to FIG. 6G as indicated by directives 194 in FIG. 6F and 196 in FIG. 6G.

Figure 6G:
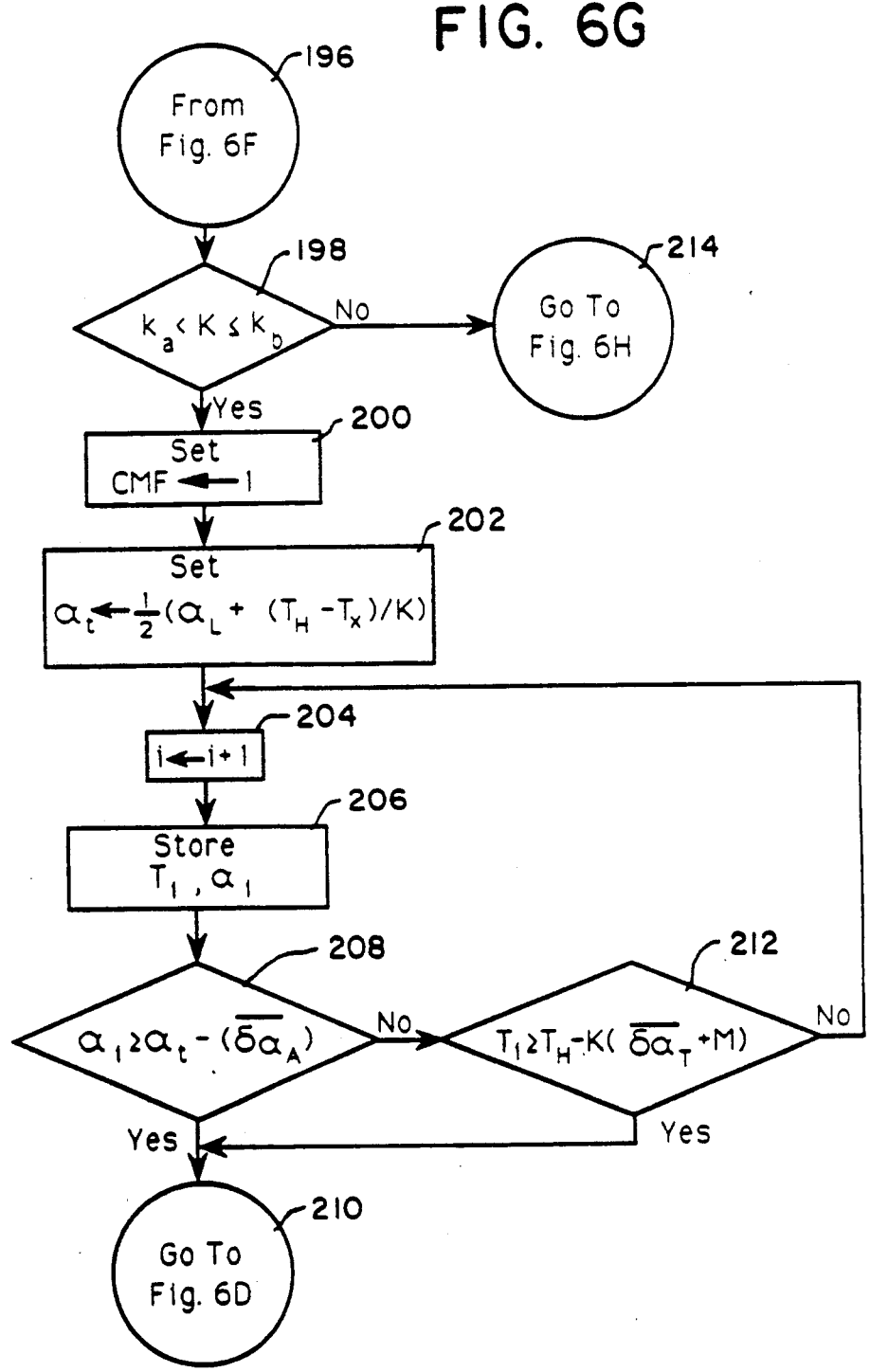

FIG. 6G applies to the first zone $Z_1$ case illustrated in FIG. 2A. Decision block 198 determines whether the slope K falls within zone $Z_1$ of FIG. 2A. If the calculated slope K is less than or equal to $k_b$ and greater than $k_a$, then it is determined that the fastener is headed for zone $Z_1$ of the window W. In that situation, the control mode flag CMF is set to a value of 1 to indicate angle control in block 200. A target angle $\alpha_t$ is defined in process block 202 to be an angle value which is halfway (50%) through the window W along a predicted characteristic curve originating at point x and having a slope of K. Thus, the equation for the target angle is given in block 202 as equation (7), above.

Next, tightening continues sampling torque and angle values as indicated in process blocks 204 and 206 until the instantaneous value of angle $\alpha_i$ meets or exceeds an angle value which is calculated to place the final angle value of $\alpha_i$ at the target angle $\alpha_t$. Thus, tightening is terminated as described with reference to FIG. 6D when a shut-off value of angle is reached where the instantaneous value of angle as determined in process block 208 meets or exceeds the target angle less a correction for angle control tool overrun. It is not necessary to include a delay factor equal to the execution margin M in the calculation of block 208 since it is desired to stop exactly halfway through the window W along the line originating at point x in FIG. 2A and of slope K.

It should be noted that since the torque and angle values are not continuously sampled but only sampled at intervals depending upon the angle increments p, the shut-off command may not be issued exactly at the target angle less the delay factors but should be within one angle increment after the calculated shut-off angle. In any event, when the instantaneous angle $\alpha_i$ meets or exceeds the calculated shut-off angle equal to the target angle less the delay factors, tightening is terminated as described with respect to FIG. 6D as indicated by signs 210 in FIG. 6G and 166 in FIG. 6D.

If the instantaneous angle value $\alpha_1$ has not yet reached the calculated shut-off angle $\alpha_{sh}$ (where $\alpha_{sh} = \alpha_t - \overline{(\delta\alpha_A)}$), then it is determined in decision block 212 whether the instantaneous torque value $T_i$ is becoming too close to the high torque limit $T_H$. If the instantaneous torque value $T_i$ comes within the delay factor discussed with respect to decision block 162 of the high torque limit, then tightening is terminated according to FIG. 6D. If not, torque and angle sampling continues until one of the conditions of decision blocks 208 or 212 is satisfied.

Figure 6H:
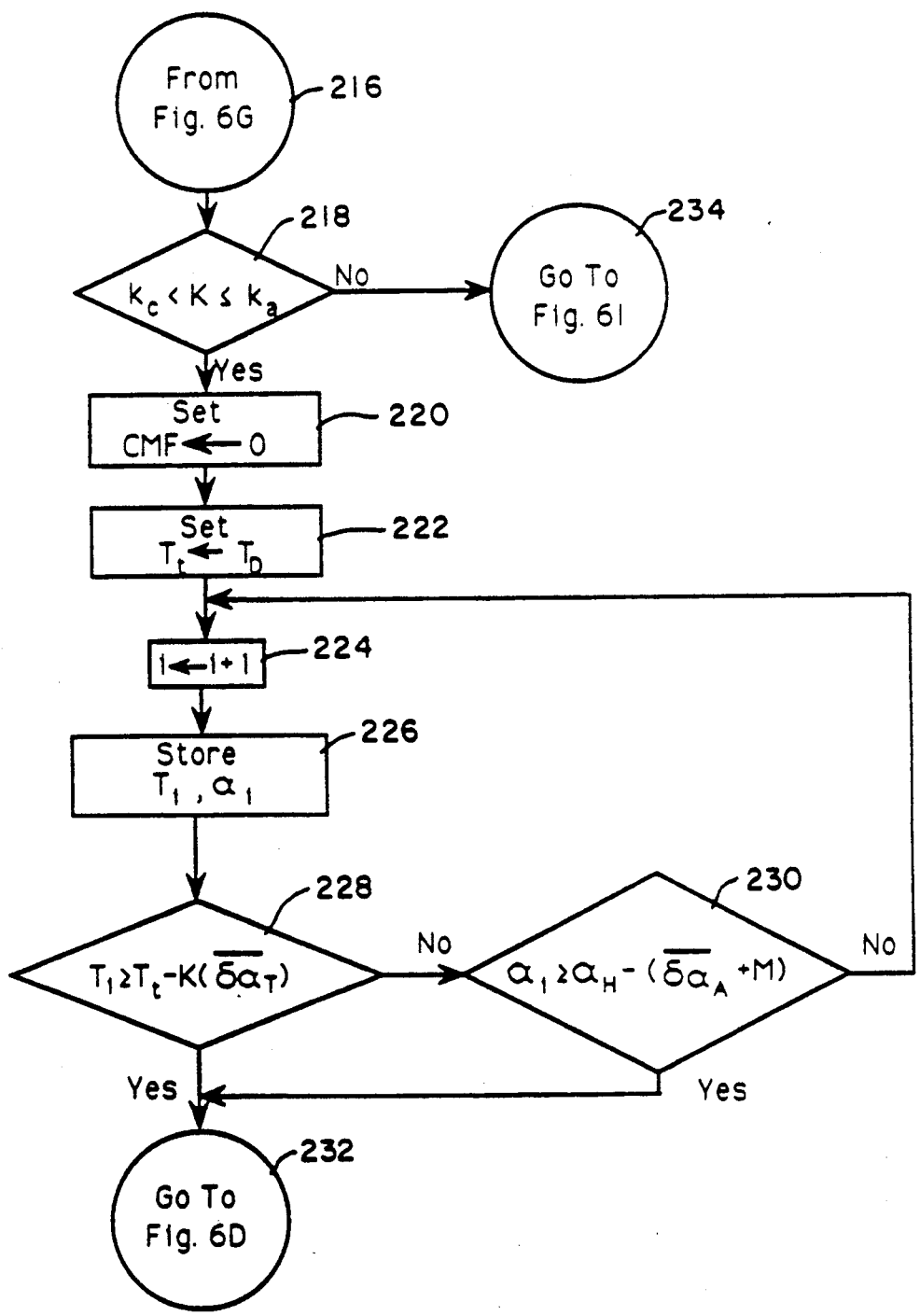

Referring back to decision block 198, if the calculated slope K is not within zone $Z_1$ of FIG. 2A, then the program proceeds to FIG. 6H as indicated by directive block 214 of FIG. 6G and directive block 216 of FIG. 6H. FIG. 6H shows the flowchart for handling the situation illustrated in FIG. 2A in which the calculated slope K falls within zone $Z_2$ of the window W in FIG. 2A. If decision block 218 determines that the calculated slope K is less than or equal to $k_a$ but greater than $k_c$, then the control mode flag is set to zero to indicate that torque control will be used in accordance with the rule of thumb. From process block 220, the program proceeds to set a target torque $T_t$ equal to the desired torque $T_D$ in process block 222 (equation (8), above).

The program then proceeds to a sample and check loop including count increment block 224, sampling block 226 and decision blocks 228 and 230. Decision block 228 determines whether the instantaneous torque value $T_i$ is greater than or equal to a shut-off torque value which is calculated to be the target torque less a delay correction factor of the slope times the average torque control tool overrun $\overline{\delta\alpha_T}$ (shut-off torque $R_{sh} = T_t - K(\overline{\delta\alpha_T})$). If the instantaneous torque value $T_i$ does exceed the calculated shut-off torque value $T_{sh}$, then fastening is terminated according to FIG. 6D as shown in block 232. If not, decision block 230 checks to determine whether the instantaneous angle value $\alpha_i$ equals or exceeds an angle shut-off value which is calculated to be the high angle limit $\alpha_H$ less the angle control tool overrun $\overline{\delta\alpha_A}$ and the execution margin M, to insure that the high angle limit $\alpha_H$ is not exceeded. If the instantaneous angle value $\alpha_i$ exceeds the shut-off angle value so calculated, then tightening terminates according to FIG. 6D as indicated by directive block 232 in FIG. 6H and directive 166 in FIG. 6D.

Figure 6I:
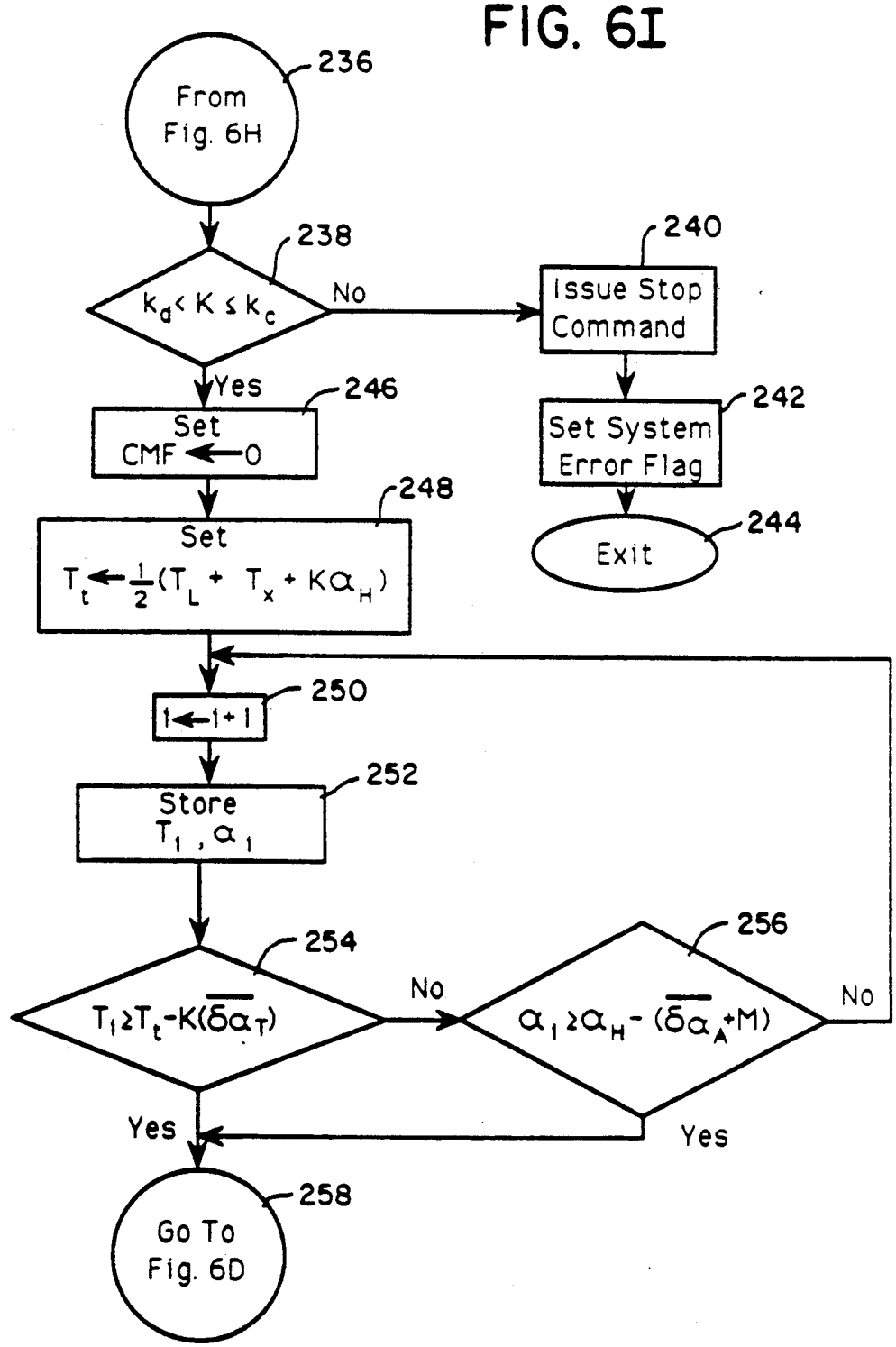

If the slope K is not within zone $Z_2$ illustrated in FIG. 2A, then decision block 218 of FIG. 6H directs the program to FIG. 6I as indicated by directive blocks 234 in FIG. 6H and 236 in FIG. 6I. FIG. 6I applies to the zone $Z_3$ situation illustrated in FIG. 2A. In that situation, K is less than or equal to $k_c$ and greater than $k_d$ as indicated in decision block 238. If decision block 238 determines that this is not the case, then a stop command is issued immediately and a system error flag is set in process blocks 240 and 242, and the program is exited in block 244. That must be the case since all possible situations for the value of K are dealt with by the time the program reaches this point.

If decision block 238 is determined affirmatively, then the control mode flag CMF is set to zero in process block 246 to indicate torque control and a target torque $T_t$ is set in block 248. The target torque $T_t$ is set to a value occurring on the line originating from point x having a slope K and which is halfway through the window W, which would be at the intersection of the curve gd in FIG. 2A and the line through point x of slope K. The target torque $T_t$ is calculated in process block 248 using equation (9), above.

From process block 248, the program proceeds to a sample and check loop consisting of process blocks 250 and 252 and decision blocks 254 and 256 which are identical to the blocks 224, 226, 228 and 230 described with reference to FIG. 6H. If either of the decision blocks 254 and 256 is determined affirmatively, tightening is terminated according to FIG. 6D as indicated by directive 258 in FIG. 6I and directive 166 in FIG. 6D.

Referring back to FIG. 6F, if decision block 190 determines that $k_a$ is less than or equal to $k_c$, then the next determination made in decision block 192 is whether $k_c$ is less than or equal to K and K is less than or equal to $k_b$. If that condition is satisfied, then the joint is directed for zone $Z_1$ illustrated in FIGS. 3 or 4 (or for $k_c = K = k_a$ in FIG. 4). In this zone, angle control is preferably used so the control mode flag is set to 1 in process block 260 of FIG. 6F. A target angle $\alpha_t$ is defined in process block 262 at halfway through the window along the predicted characteristic curve having a slope of K and originating at point x' in FIG. 3. The equation for this is the same as equation (10), above, also described with reference to process block 202 in FIG. 6G.

After process block 262, the angle control subroutine consisting of process blocks 264, 266 and decision blocks 268 and 270 is entered, which is identical to the angle control subroutine of blocks 204, 206, 208 and 212 already described respecting FIG. 6G. If either of the conditions of decision blocks 268 and 270 is satisfied, tightening is terminated according to FIG. 6D as indicated by directive 272 of FIG. 6F and directive 166 of FIG. 6D.

Figure 6J:
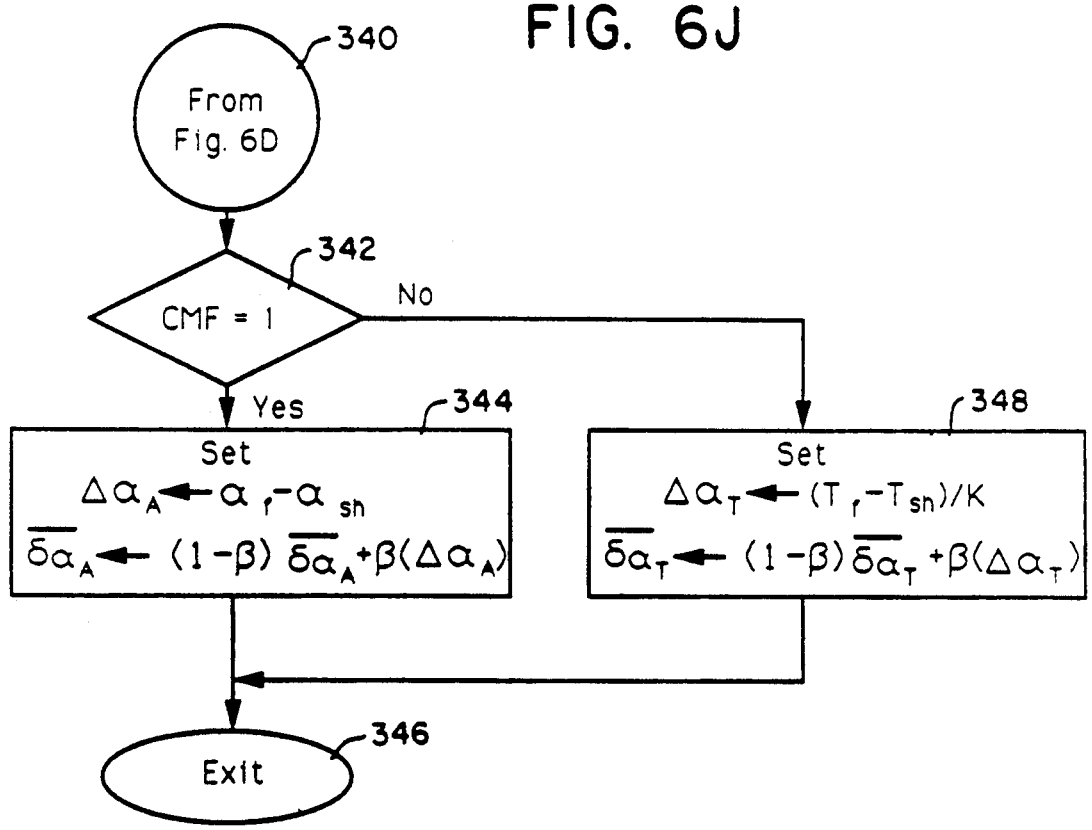
Figure 6K:
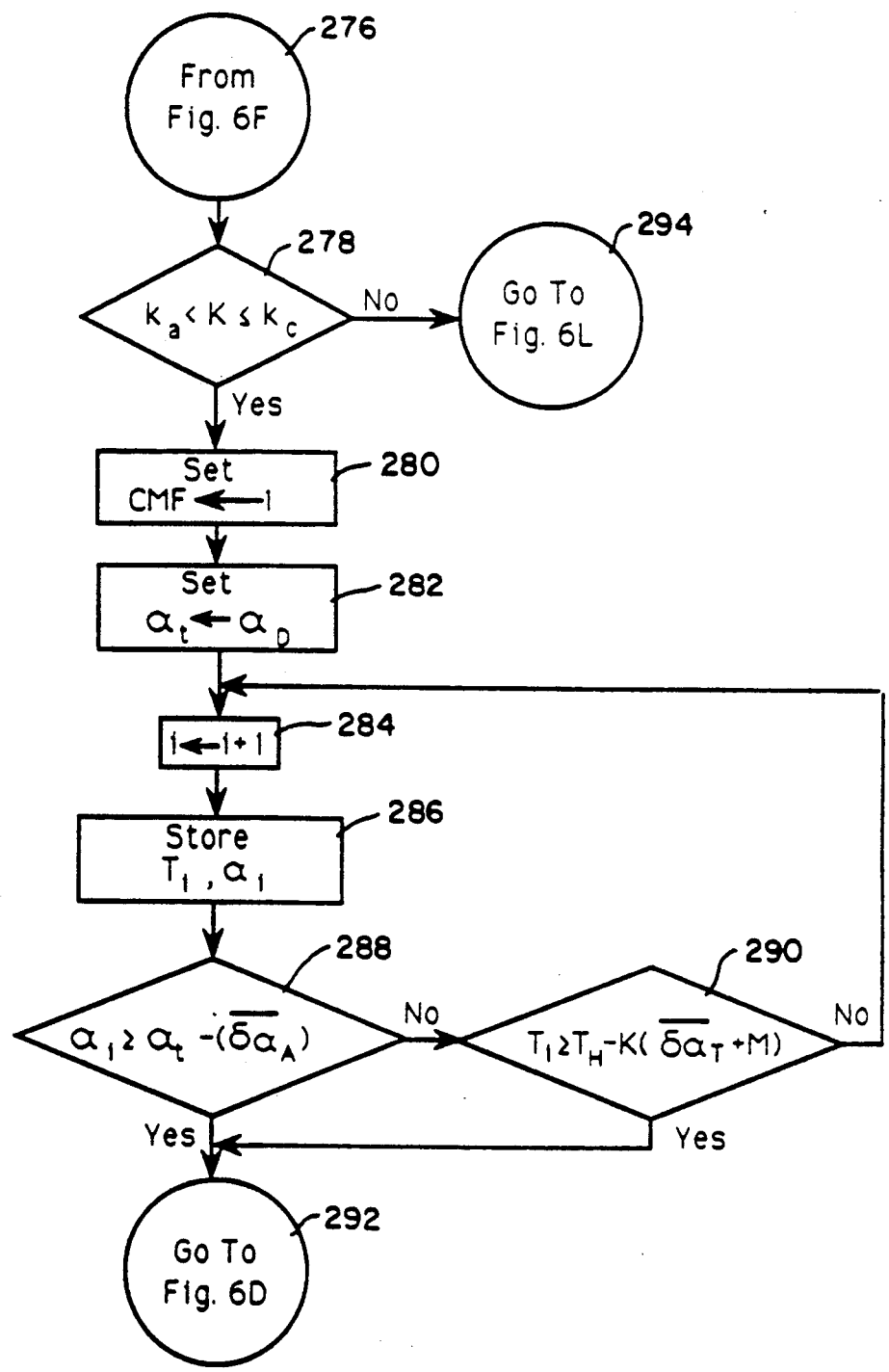

If decision block 192 indicates that the slope K is not within zone $Z_1$ of FIG. 3, then the program flows to FIG. 6K as indicated by directive 274 of FIG. 6F and directive 276 of FIG. 6K. If decision block 278 of FIG. 6K is satisfied, then zone $Z_2$ of FIG. 3 applies and the control mode flag CMF is set equal to 1 in block 280 to indicate angle control. Process block 282 sets the target angle $\alpha_t$ equal to the desired angle $\alpha_D$ (see equation (11), above), and the angle control subroutine consisting of blocks 284, 286, 288 and 290 is entered (See FIGS. 6F and 6G). If either of the decision blocks 288 and 290 is determined affirmatively, tightening is terminated according to FIG. 6D as indicated by directive block 292 of FIG. 6K and directive block 166 of FIG. 6D.

If it is determined in decision block 278 of FIG. 6K that the slope K does not fall within zone $Z_2$ of FIG. 3, then directive block 294 of FIG. 6K directs the program to directive block 296 of FIG. 6L. Decision block 298 of FIG. 6L determines whether the slope K falls within zone $Z_3$ of FIG. 3. If it does not, then a stop command is issued immediately by process block 300, a system error flag is set in process block 302 and the program is exited via exit block 304. If decision block 298 is determined negatively, then an error must have occurred since all of the possible values for K have been previously dealt with.

If K is determined to be less than or equal to $k_a$ but greater than $k_d$ so that decision block 298 is determined affirmatively, the control mode flag CMF is set equal to zero to indicate torque control in process block 306. The target torque is then set equal to a torque value occurring on the line originating at point x of slope K and halfway through the window W' as determined by the equation in process block 308, which is the same as equation (12) above.

Next, the torque control subroutine consisting of blocks 310, 312, 314 and 316 is entered which is the same as the torque control subroutine in FIGS. 6H and 6I. If either of the decision blocks 314 and 316 is determined affirmatively, then tightening is terminated according to FIG. 6D as indicated by directive block 318 of FIG. 6L and directive block 166 of FIG. 6D.

Referring to the tool stopping subroutine of FIG. 6D, the first process executed is to issue a stop command to the tool as indicated in process block 320. It should be understood that the tool does not stop immediately upon the issuance of the stop command at process block 320. Rather, particularly for air powered tools, it takes time for the tool to stop due to the time it takes for the solenoid 16 to stop the flow of air to the nutrunner 12, for residual compressed air in the nutrunner 12 to be evacuated through the air motor 18, and for the rotational inertia of driving the fastener 24 with the nutrunner 12 to dissipate. Therefore, even after the stop command is issued at process block 320, torque and angle values continue to be sampled.

Immediately following process block 320 in FIG. 6D, the current instantaneous values of torque $T_i$ and angle $\alpha_i$ are set equal to shut-off torque value $T_{sh}$ and to shut-off angle value $\alpha_{sh}$, respectively, in process block 322. Next, a sample and check loop including incrementing and storing processes 324 and 326 and decision block 328 is entered. Decision block 328 determines whether the fastener has stopped. When the flow of angle pulses stops as determined in decision block 328, it is inferred that the fastener has stopped rotating and the program proceeds to process block 330. In process block 330, the final torque $T_f$ is set equal to the maximum of the last seven torque values sampled. This maximum is indicated in process block 330 by $T_{nmax(n=i\ to\ (i-6))}$. The reason for this is that the torque measurement may tail off near the end and it is desired to use the highest torque reading obtained in the vicinity of the end of tightening for the final torque value $T_f$. There is no such reason to correct the angle values and so the final angle $\alpha_f$ is set equal to the last instantaneous angle value $\alpha_i$.

It is then determined in decision blocks 332 and 334 whether the final torque and angle values $T_f$ and $\alpha_f$ are within the torque-angle specification window. If the final torque $T_f$ is not within or on the limits of torque $T_L$ and $T_H$, as determined by decision block 332, then a bad joint flag is set in process block 336 and the program goes to FIG. 6J as indicated by directive block 338. If decision block 332 determines that the final torque is greater than or equal to the low torque limit $T_L$ and less than or equal to the high torque limit $T_H$, then the program proceeds to decision block 334.

In decision block 334, it is determined whether the angle $\alpha_f$ is within or on the limits of angle $\alpha_L$ and $\alpha_H$. If not, the bad joint flag is set in process block 336 and the program proceeds to FIG. 6J. If the final angle $\alpha_f$ is greater than or equal to the low angle limit $\alpha_L$ and less than or equal to the high angle limit $\alpha_H$, then the joint is within or on the torque-angle specification window. In that case, a good joint flag is set in process block 340 to indicate to the operator the acceptance of the joint and the program proceeds to FIG. 6J as indicated by directive block 338 of FIG. 6D and directive block 340 of FIG. 6J.

FIG. 6J is for adjusting the values of tool overrun depending upon whether angle control or torque control is used. If decision block 342 determines that the control mode flag equals 1, then angle control was used for the fastener which was just tightened. Therefore, if decision block 342 is determined affirmatively, the program proceeds to process block 344.

In process block 344, the actual value of the tool overrun $\Delta\alpha_A$ is set equal to the final angle $\alpha_f$ minus the shut-off angle $\alpha_{sh}$. The angle control tool overrun $\overline{\delta\alpha_A}$ is also adjusted in accordance with the value of tool overrun $\Delta\alpha_A$ by a weighting factor $\beta$, which is one of the input parameters. $\beta$ may be any desired factor between 0 and 1, a typical value being 0.2. After the new value of the angle control tool overrun $\overline{\delta\alpha_A}$ is set in process block 344, the program is exited via exit block 346 to wait for the initiation of another fastener tightening cycle at block 110 in FIG. 6A.

If decision block 342 of FIG. 6J is determined negatively, then torque control was used for the fastener just tightened. In that case, the current value of tool overrun $\Delta\alpha_T$ is set equal to the difference between the final torque and the shut-off torque divided by the slope K in process block 348. The new value of the torque control tool overrun $\overline{\delta\alpha_T}$ is then adjusted in accordance with the current value of tool overrun and using weighting factor $\beta$ according to the equation given in process block 348 and the program is exited via block 346.

It should be noted that in this strategy for adjusting the tool overrun, tightening operations occurring in the high and low slope envelopes (see FIG. 2B) contribute to the adjustments for the tool overruns, as well as joints which were not within the torque-angle window. If desired, the tool overruns could only be adjusted for fasteners which are predicted to be directed for the window, or those that actually end up in the window.

Also, in all instances of tightening in any of the zones of any specification window, the upper limit of torque $T_H$ is avoided if angle control is used and the upper limit of angle $\alpha_H$ is avoided if torque control is used. This is accomplished by accounting for both the tool overrun and an execution margin, so that these limits are not knowingly exceeded, thereby avoiding the creation of rejects.

EXAMPLE

In actual tightening tests conducted according to a process of the invention, a torque-angle specification window was defined and fastener pairs were tightened according to the process. The results of those tests are set forth below.

Defining the Window

Development of assembly specifications requires knowledge of the joint characteristics. Since theoretical approaches to calculating joint characteristics lack accuracy, joint characteristics were determined empirically. Actual parts were used in a series of rundowns where torque, angle and tension were measured in every case. In order to produce good data correlations, a range of angle, torque and tension was considered.

A test joint was put through all the procedures relevant to formation of the window specifications. The test joint consisted of SAE Grade 8 bolts and nuts ($\frac{7}{8}"\times 24$) with a hardened washer under the nut clamping a hollowed steel column forming a grip length of 2.4 inches (61 mm). Tension was measured ultrasonically shortly after each run. Sonic bolt stretch was correlated to bolt tension by pulling samples of the bolts under a tensile tester. An instrumented electric tool connected to an Allen-Bradley Pro Spec TM 6000 fastening system allowed a choice of tightening strategies to obtain basic torque-angle data.

Before starting the test, the approximate values of torque at yield and angle at yield were determined in order to plan the test. A few runs to yield showed a typical torque of 85 Nm and a typical angle of 135 degrees from a torque reading of 30 Nm. This information is needed to select the threshold torque $T_x$ which should be in the range of 0.3 to 0.5 times the typical torque to yield. The value of 30 Nm is a round number within this range. It would be advisable to plan the test for the approximate range of 60 to 90% of yield (the listed minimum yield for the test fastener is 50.62 KN) or 30 to 45 KN. Using the typical yield torque $T_y$ and angle $\alpha_y$ it is possible to calculate roughly, the angles (from 30 Nm) necessary to conduct the test using a torque-turn strategy as follows:

$$C_1 = F_y/T_y = 50.62/85 = 0.596 \ KN/Nm \qquad (22)$$

$$C_1 T_x = 17.88 \ KN$$

$$C_2 = (F_y - C_1 T_1)/\alpha_y = 32.74/135 = 0.243 \ KN/deg \qquad (23)$$

where
$C_1$ = the tension-torque ratio;
$C_2$ = the tension rate; and $$F = \text{bolt tension or clamp load} = C_1 T_1 + C_2 \alpha \qquad (24)$$

Tension in the elastic zone can then be calculated approximately using equation (24)

$$F = 17.88 + 0.243 \ \alpha$$

The test was then planned for an angle range of 50 to 112 degrees corresponding approximately to a tension range of 30 to 45 KN. Complete data are shown in the following Table 1.

TABLE 1

| Run No. | Torque, Angle, Torque Rate and Tension Data for the Test Joint | | | |
|---|---|---|---|---|
| | T, Nm | α, deg | K, Nm/deg | F, KN |
| 1 | 84.3 | 111.7 | .5304 | 44.08 |
| 2 | 72.0 | 111.7 | .4644 | 37.28 |
| 3 | 75.8 | 92.9 | .5235 | 39.72 |
| 4 | 76.4 | 92.9 | .4982 | 45.99 |
| 5 | 75.8 | 92.9 | .5592 | 45.06 |

TABLE 1-continued
Torque, Angle, Torque Rate and Tension Data for the Test Joint

| Run No. | T, Nm | α, deg | K, Nm/deg | F, KN |
|---|---|---|---|---|
| 6 | 68.2 | 74.1 | .5377 | 37.77 |
| 7 | 69.5 | 74.1 | .5440 | 38.25 |
| 8 | 62.5 | 74.1 | .5659 | 41.64 |
| 9 | 65.7 | 74.1 | .5184 | 32.43 |
| 10 | 58.1 | 54.4 | .5161 | 32.43 |
| 11 | 59.2 | 54.4 | .6248 | 30.47 |
| 12 | 61.6 | 54.4 | .6099 | 32.43 |
| 13 | 63.0 | 54.4 | .6406 | 31.45 |
| 14 | 88.1 | 111.7 | .6638 | 44.57 |
| 15 | 68.5 | 111.7 | .3784 | 40.66 |
| 16 | 83.7 | 111.7 | .5386 | 47.46 |
| 17 | 80.2 | 111.7 | .4598 | 44.57 |
| 18 | 79.9 | 111.7 | .4869 | 46.97 |
| 19 | 78.5 | 111.7 | .4869 | 45.51 |
| 20 | 73.1 | 111.7 | .4681 | 52.80 |
| 21 | 71.7 | 111.7 | .3855 | 44.57 |
| 22 | 65.2 | 111.7 | .4347 | 45.99 |
| 23 | 70.1 | 92.9 | .4541 | 43.59 |
| 24 | 70.1 | 92.9 | .4984 | 42.61 |
| 25 | 70.4 | 92.9 | .4347 | 45.51 |
| 26 | 63.5 | 92.9 | .4541 | 44.08 |
| 27 | 70.6 | 92.9 | .4412 | 38.74 |
| 28 | 64.6 | 74.1 | .4759 | 38.25 |
| 29 | 61.6 | 74.1 | .4508 | 38.74 |
| 30 | 67.1 | 74.1 | .5267 | 40.66 |
| 31 | 58.6 | 74.1 | .4170 | 37.77 |
| 32 | 62.2 | 54.4 | .6290 | 34.83 |
| 33 | 52.1 | 54.4 | .3871 | 29.98 |
| 34 | 49.1 | 54.4 | .3507 | 34.83 |
| 35 | 51.0 | 54.4 | .3866 | 32.43 |
| 36 | 78.5 | 101.8 | .5239 | 43.59 |
| 37 | 70.1 | 101.8 | .4508 | 45.06 |
| 38 | 70.6 | 83.0 | .5161 | 39.23 |
| 39 | 65.2 | 83.0 | .4644 | 36.79 |
| 40 | 59.5 | 64.3 | .4608 | 36.79 |
| 41 | 61.1 | 64.3 | .5440 | 33.90 |
| 42 | 53.2 | 49.4 | .4713 | 31.94 |
| 43 | 51.3 | 49.4 | .4442 | 30.25 |
| 44 | 65.2 | 83.0 | .4376 | 41.64 |
| 45 | 61.4 | 64.3 | .4982 | 33.90 |
| 46 | 64.6 | 64.3 | .5760 | 34.83 |
| 47 | 54.5 | 49.4 | .4937 | 32.43 |
| 48 | 54.3 | 49.4 | .5033 | 33.90 |
| 49 | 52.4 | 49.4 | .4541 | 33.90 |
| 50 | 61.4 | 64.3 | .5032 | 35.32 |
| 51 | 55.9 | 64.3 | .4087 | 36.79 |
| 52 | 65.7 | 83.0 | .4211 | 40.66 |
| 53 | 75.8 | 101.8 | .4752 | 43.10 |
| 54 | 75.0 | 101.8 | .4634 | 45.99 |

In order to collect torque-rate data (slope of the torque-angle curve) a two point calculation of the torque rate was made between 30 and 49 Nm in every run using the equation $K=(T_y-T_x)/\alpha_{xy}$. The basic data therefore consists of four sets of useful numbers, namely torque, angle, torque rate and tension. This is sufficient to derive high and low torque and angle limits to define the specification window as follows.

First, formal mathematical relationships between F, T and α must be determined. Linear regression analysis may be used for this to determine the best straight line relationships between the four quantities, given the data in Table 1. This method is well known and more fully explained in P. G. Hoel, Introduction to Mathematical Statistics, fifth edition, John Wiley & Sons, 1984, and other references.

The outcome of a linear regression entering y as a function and x as a variable is a set of four numbers. Two of the resultant numbers define the equation for a straight line. Another of the resultant numbers is the correlation coefficient r or r(x,y) and the fourth is the standard deviation $S_y$ for the function y whose average or mean is the derived straight line. The standard deviation of the regression, $S_y$, equals the standard deviation of data values of $Y_i$, i=1,2, ... n multiplied by $(1-r^2)^{\frac{1}{2}}$.

$$S_y = S_{yi}(1-r^2)^{\frac{1}{2}} \quad (25)$$

The quantities symbolized by $S_{yi}$ are the standard deviations given in Table 2:

TABLE 2
Statistical Summary of the Basis Data

| | T, Nm | α, deg | K, Nm/deg | F, KN |
|---|---|---|---|---|
| Sample Size | 54 | 54 | 54 | 54 |
| Sample Mean | 66.44 | 80.96 | 0.4899 | 39.151 |
| Standard Deviation | 9.28 | 22.13 | 0.0683 | 5.518 |
| Observed High | 88.1 | 111.7 | 0.6638 | 52.80 |
| Observed Low | 49.1 | 49.4 | 0.3507 | 29.98 |

For instance, in Table 2, $S_{yi}$ corresponding to angle α is 22.13 degrees. If x is entered as the function, and y is the variable, r will remain unchanged but other quantities will change.

The regression analysis of tension F as a function of torque T using the data of Table 1 resulted in the following relationships:

$$F = 8.176 + 0.4662\, T \quad (26a)$$

$$r = 0.7842 \quad (26b)$$

$$S_F = 5.518\,(1-0.7842^2)^{\frac{1}{2}} = 3.424\ KN \quad (26c)$$

Figure 7:
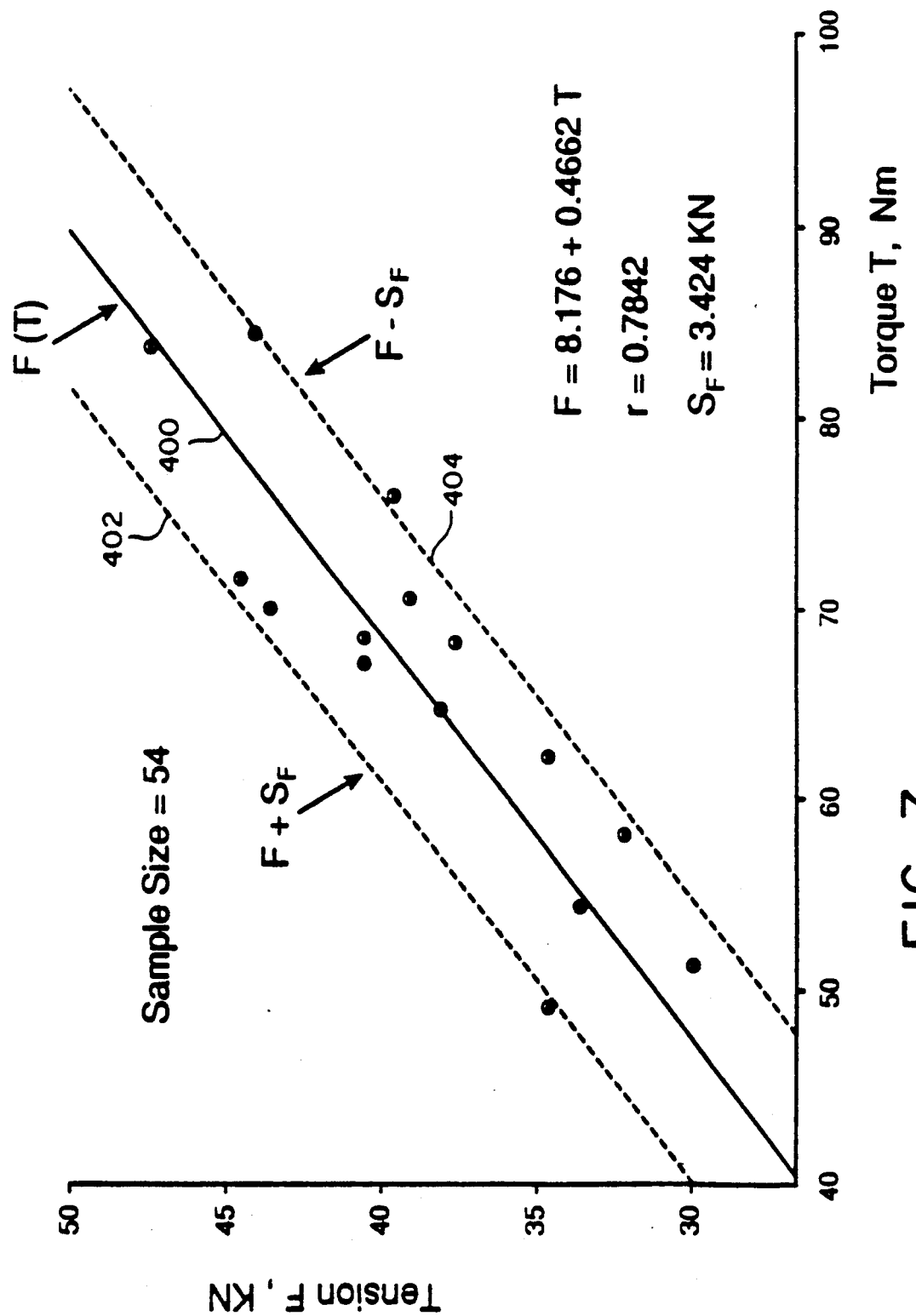
FIG. 7 is a tension-torque correlation graph for a test joint.

FIG. 7 shows these results graphically. The solid line 400 is the best fit, being the line for equation (26a), and the dotted lines 402 and 404 show the one-standard-deviation uncertainty. The zone bounded by the dotted lines 402 and 404 should contain 68.3% of the torque-tension data for the test joint when the number of rundowns approaches infinity. This is how one extrapolates from small to large samples assuming "normal distribution".

FIG. 7 also shows some of the data points in the form of small circles. The correlation coefficient r represents the degree of fit. If r were equal to 1 for a rising trend (or −1 for a falling trend), then the fit would be perfect and the uncertainty $S_F$ would vanish. On the other hand, if r is very small, then no correlation exists and the uncertainty $S_F$ remains at the level of the data scatter for tension.

Referring to equation (25), one can define (based on one's taste) what value of r is meaningful and what level is strong. If $(1-r^2)^{\frac{1}{2}}=0.60$ then the correlation has reduced the data uncertainty (scatter) by 40%. On this basis, the absolute value of $r \geq 0.6$ can be regarded as meaningful when the correlation reduces uncertainty by 20%, and the absolute value of $r \geq 0.87$ can be regarded as a good correlation when more than half the uncertainty is eliminated. Based on this subjective view, the F-T correlation (26c) qualifies as "so-so".

Finally the fact that the line defined by equation (26a) does not pass through the origin (i.e. $F \neq 0$ when $T=0$) should not be bothersome. Since the basic data stops at 29.98 KN for tension and 49.1 Nm for torque, the correlation is not expected to apply to values of F or T much below these limits. The positive value of tension at zero torque resulting from fit (26a) means that in the range considered the actual tension versus torque curve tends to bend over somewhat (less tension at higher torque).

Other correlations of interest are given as follows:

Relating tension and angle, $$F = 21.288 + 0.2206\,\alpha \qquad (27a)$$

$$r = 0.8849 \qquad (27b)$$

$$S_F = 2.570\ KN \qquad (27c)$$

Relating torque and angle, $$T = 36.869 + 0.3652\,\alpha \qquad (28a)$$

$$r = 0.8709 \qquad (28b)$$

$$S_T = 4.561\ Nm \qquad (28c)$$

Relating angle and torque, $$\alpha = -57.007 + 2.0766\,T \qquad (29b)$$

$$r = 0.8709 \qquad (29b)$$

$$S_\alpha = 10.876\ deg \qquad (29c)$$

It is instructive to look at a pair of variables in Table 1 that are not physically related. All the data in Table 1 arise from angle-control rundowns albeit at different angle settings. The torque rate K is a quantity that is preferably determined at the second threshold torque level whose value depends on the particular make up of physical quantities prevailing for that run. Any prescribed angle greater than the angle from the first threshold to the second threshold as the final target therefore should not influence the torque rate K. Regression analysis yields the following relationships:

$$K = 0.5202 - 0.00037\,\alpha \qquad (30a)$$

$$r = -0.1214 \qquad (30b)$$

$$S_{ki} = 0.0683 \qquad (30c)$$

$$S_K = 0.0678 \qquad (30d)$$

The small value of r and the fact that the correlation has virtually the same standard deviation as that of the torque rate data, confirms that torque rate and angle are not significantly related.

Relationships (28a–c) indicate that torque is a function of angle with a good correlation. Torque and angle therefore cannot be specified independently. One must choose a primary control variable first. The particular data analyzed shows that angle $\alpha$ correlates better with tension. From a purely technical viewpoint therefore, angle should be chosen as the primary control variable. However, the following analysis works out the specifications both ways.

Angle As Primary Variable

It is assumed that the joint in question is limited by the strength of the fastener pair. The listed or minimum yield for the fastener pair used in the test is 50.62 KN. The high limit of the angle should then be chosen such that the fasteners will not yield within a confidence level. As far as the confidence level is concerned, a three standard deviation range about the mean is traditional. Statistical analysis gives a one-sided confidence level of 99.87% or a two-sided level of 99.73%, or, exceptions of 1/741 and 1/370 respectively. In choosing yield as a limit, the confidence and exception probabilities are one-sided. Referring to equation (27c), F has an uncertainty of $3 \times 2.57 = 7.71$ KN. In order to avoid yield with a confidence level of 99.87%, the tension derived from the F-$\alpha$ correlation should not exceed $50.62 - 7.71$ or 42.91 KN. The high angle from equation (27a) is then 98.01 that rounds to $\alpha_H = 98$.

If one could repeatedly control an angle target of 98 degrees, a tension spread of 35.20-42.91-50.62 KN or $42.91 \pm 18\%$ would result. This, however, is not practical— a low limit $\alpha_L$ and therefore a tolerance range should be specified. There are two approaches to this, namely: (i) insist on a low tension limit to assure service integrity of the joint and let the assembly plant acquire the equipment adequate for the task; or (ii) use a reasonable process capability based on existing equipment and complete the tolerance range or the specifications.

Approach (ii) is practiced by engineers except in very critical post-design situations. As an example, for case (i) above a minimum tension of 34 KN may be assumed as mandatory. The value $34 + 7.71 = 41.71$ KN is then substituted in equation (27a) to arrive at a minimum angle of 92.57, rounded to 93 degrees. The assembly equipment then should be capable of controlling angle with 93-98 degrees or $95.5 \pm 2.5$ degrees. This range for angle control is achievable with an electric nutrunner, but well out of range of even the best air nutrunners.

In using approach (ii), an angle control process capability must first be assumed. A well controlled air nutrunner with electronic controls allowing for tool overrun anticipation can easily control to within $\pm 7$ degrees. The low angle limit would then be $98 - (2 \times 7) = 84$ degrees. Angle specifications are then established to be 84-91-98 degrees where the middle figure is the nominal target.

In order to form a window, torque limits must be established. Torque would then be the secondary control variable. Its utility is strictly for purposes of quality control (automatic detection of abnormalities). Given the target angle of 91 degrees one must find the natural scatter of torque. This is done by using the T-$\alpha$ correlation equation (28a) and the 99.73% confidence level corresponding to three standard deviations. Inserting 91 for $\alpha$ in equation (28a) gives a torque value of 70.10 Nm. The high and low limits are then $70.10 \pm 3 \times 4.56$ or 56.42 to 83.79 Nm. An "angle-dominated" window can then be defined.

$\alpha_L = 84$ deg, $\alpha_H = 98$ deg
$T_L = 56$ Nm, $T_H = 84$ Nm

Figure 8:
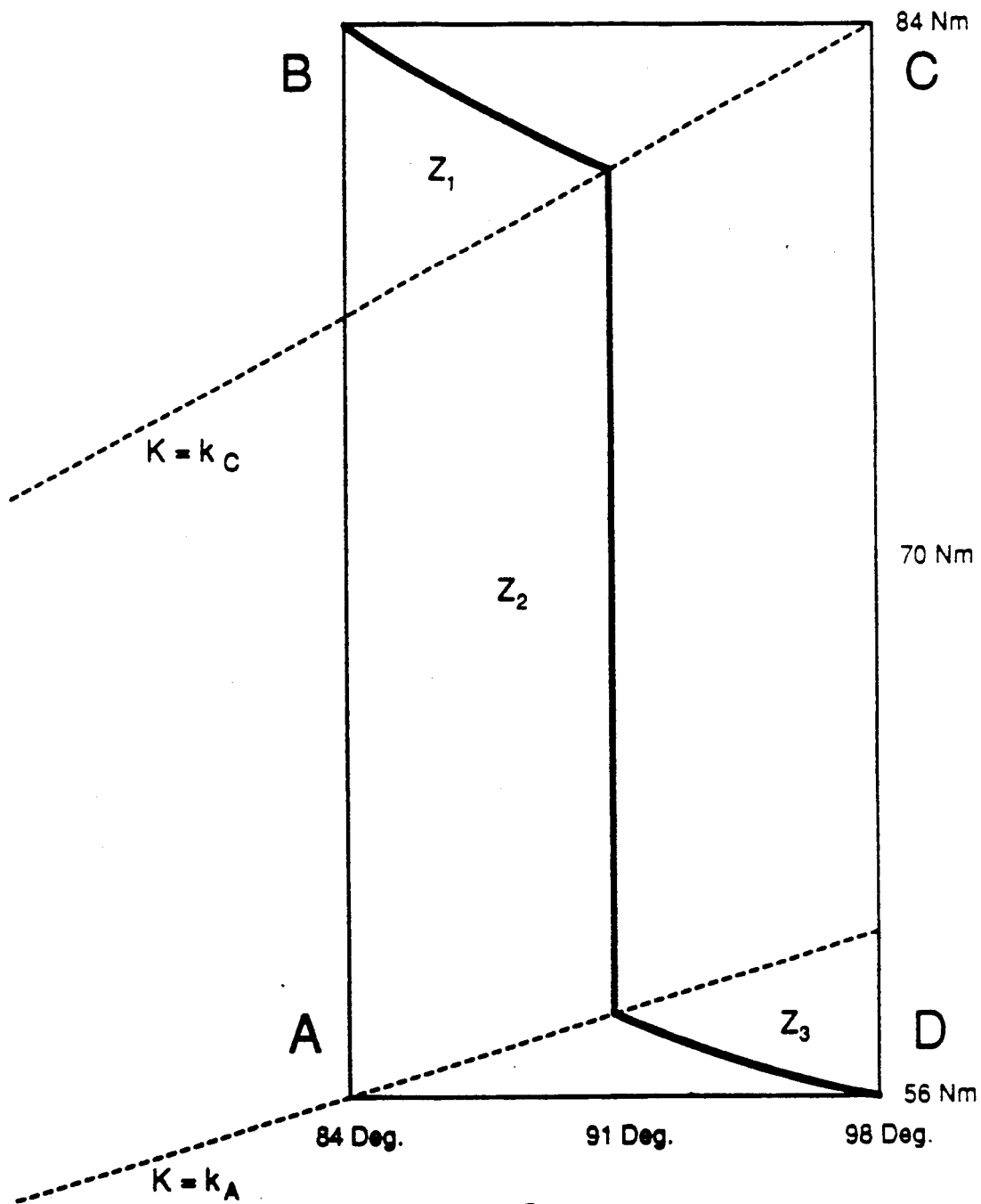
FIG. 8 illustrates an angle-dominated window derived from data for a test joint.

This T-$\alpha$ window is illustrated in FIG. 8.

Torque As Primary Variable

The procedures here are principally the same as the case of determining the window specifications using angle as the primary variable, discussed above, except for the choice of the specific correlations involved. The uncertainty in tension when torque is specified is $3 \times 3.42$, or 10.27 KN. The nominal tension value that guarantees (with a probability of 99.87%) avoidance of yield is $50.62 - 10.27 = 40.35$ KN. Substitution of this figure in equation (24) gives the high limit for torque at 69.01 Nm, rounded to 69 Nm.

For the lower torque limit it is assumed that available assembly equipment can control torque to within $\pm 11\%$ of target. The nominal torque would then be $69/1.11 = 62.16$ Nm and the low torque limit $62.16 \times 0.89 = 55.32$ Nm. Rounding, one gets 55-62-69 Nm for torque specifications.

The angle limits are derived from the natural scatter of angle at 62 Nm. For this, the α-T correlation equation (29a) is used. Substitution of 62 for T in equation (29a) gives 71.74 degrees for the nominal value. The scatter is $3 \times 10.876 = 32.63$; the natural scatter is then 39.11 to 104.37 rounding to 39-104 degrees. A "torque-dominated" window is thus defined as follows:

$T_L = 55$ Nm, $T_H = 69$ Nm
$\alpha_L = 39$ deg, $\alpha_H = 104$ deg

Figure 9:
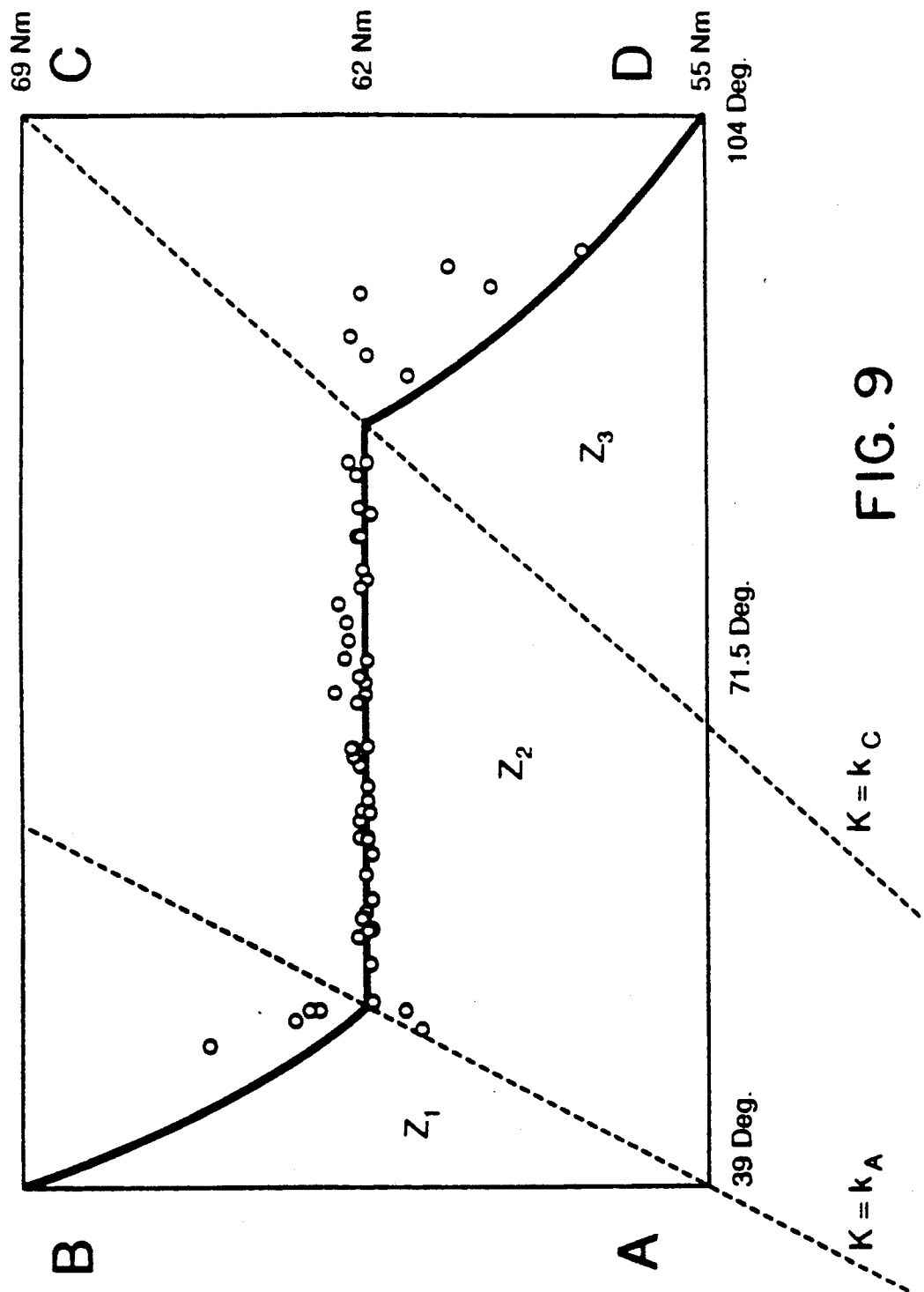
FIG. 9 illustrates a torque-dominated window derived from data for a test joint and illustrating actual rundown results of torque-angle window control using an electric tool according to a method of the invention.

This window is illustrated in FIG. 9.

A series of runs were made with the test joint using the torque-angle window control strategy described in the preceding paragraphs. The torque-dominated window derived from the data as discussed above was implemented using normal and abnormal circumstances with an electric tool and normal parts and circumstances with an air tool. The final T-α coordinates of each run when using an electric tool are shown as small circles in FIG. 9. Data points in zone 2 clustered about the torque target of 62 Nm are those determined to be in zone 2 at the second threshold torque level. If the 62 Nm line is extended to the right (into zone 3), three more data points are encountered very close to this torque level. These also were perceived to be in zone 2 at the second threshold torque level. However, the torque-angle curve bend over has caused a larger angle than expected (at the second threshold torque level) to occur at the 62 Nm final torque thus moving those points into zone 3.

The other four points in zone 3 are those produced by the methodology of zone 3, which is torque control at a level below 62 Nm along the optimal curve ending at corner D. Three of these four points are on the right of the curvilinear optimal curve again due to the T-α curve bend over near the end of the rundown.

The lowest two points in zone 2 have been reached using instructions for zone 1, which is angle control to the levels shown in the optimal curve of zone 1. Again due to the T-α curve bend over, torques achieved are less than those expected at the target angles.

The points lying in zone 1 are those executed by the zone 1 methodology. In all four cases, however, the torque-angle curves have steepened near the end of the rundown forcing final torques to be higher than those expected by theory. In the case of this electric nutrunner the execution errors are virtually non-existent (angle was controlled to better than 1 degree and torque to better than 0.8 Nm). Even so, scatter about the theoretical targets is clearly evidenced. The criterion for avoidance of upper boundaries discussed above is thus an important part of the strategy, even in the absence of execution errors.

Using the same electric tool and the same strategy, a few cases of simulated abnormalities were tested. In the first case, a small paper clip was placed under the bolt head on one side. The run was stopped at $\alpha = 102.5$ deg, $T = 47.8$ Nm. In terms of the flowchart of FIGS. 6A-L, either process block 182 or 256 was determined affirmatively, depending on the value of the torque rate K, and the cycle was terminated according to FIG. 6D. $\alpha_H = 104$ was not exceeded, thereby successfully avoiding the upper limit of angle. In this run, the execution error margin M was set equal to 1.1°. In another abnormal circumstance, a nut with the wrong pitch was threaded onto the bolt and the mismatched fastener pair tightened. The cycle was terminated at $\alpha = 102.5$ deg, $T = 35.5$ Nm. In this case the second threshold torque was not reached. Tightening was terminated via determining process block 134 affirmatively, again successfully avoiding the upper angle limit.

Figure 10:
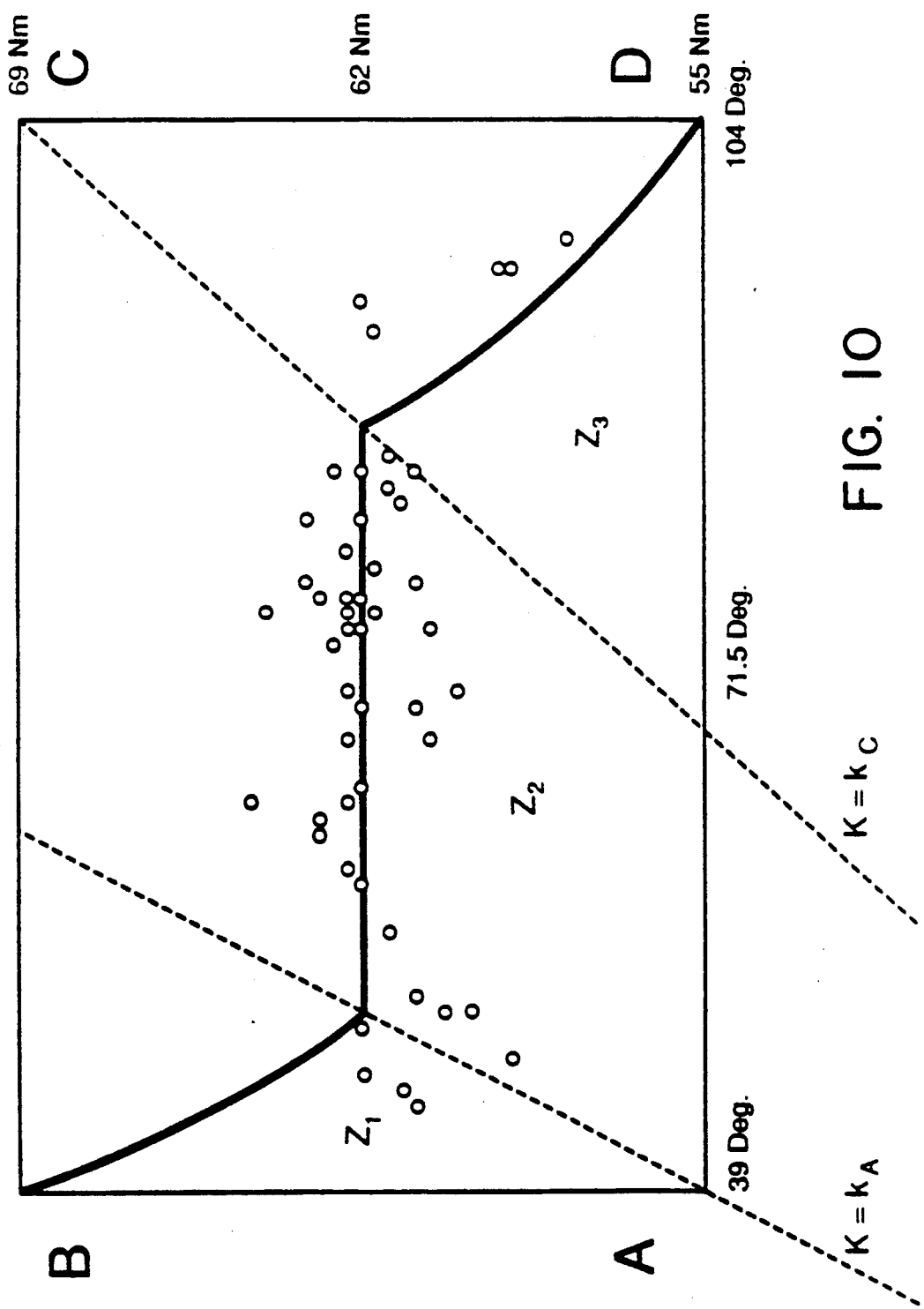
FIG. 10 illustrates actual rundown results of torque-angle window control using an air tool according to a method of the invention.

Similar tests were run using an air tool. The angle control tool overrun $\Delta \alpha_A$ varied between 6 and 9 degrees. The torque control overrun $\Delta \alpha_T$ varied between 3 and 6 degrees. The final coordinates of each rundown is presented as a small circle inside the torque-dominated window of FIG. 10. The scatter about the targets is larger than that in FIG. 9. The overall appearance of data points within the window, however, is otherwise the same as that shown for an electric tool.

Preferred embodiments of the invention have been described. Numerous modifications and variations of those embodiments will be apparent to those of skill in the art, but which are still within the spirit and scope of the invention. Therefore, the invention should not be limited by the scope of the foregoing description, but only by the claims that follow.

I claim:

1. Apparatus for tightening a threaded fastener to within a torque-angle specification window defined by a lower angle limit, an upper angle limit, a lower torque limit, and an upper torque limit, said apparatus comprising:

a powered instructable tool for tightening said fastener;

means for sensing torque and angle at various angles of advance of said fastener during tightening by the tool;

means for determining from the sensed values of torque and angle an advancement of said fastener which will result in said fastener being tightened to torque and angle values which are higher than the lower limits or torque and angle and which are inside of the torque-angle window a predetermined proportion of the way therethrough; and means for instructing the tool to terminate tightening in response to attaining said determined advancement.

2. An apparatus as in claim 1, further comprising means for determining from the sensed torque and angle values a final target parameter value which is said predetermined proportion of the way through the window.

3. An apparatus as in claim 2, wherein the final target parameter value is substantially halfway through the window along a projection of a torque-angle characteristic curve for said fastener.

4. An apparatus as claimed in claim 3, further comprising means for calculating the slope of the torque-angle curve for said fastener, means for calculating a boundary ratio associated with each of the corners of the torque-angle specification window, and means for comparing the slope of the torque-angle characteristic curve with the boundary ratios, said final target parameter value being determined based upon said comparison.

* * * * *